(12) United States Patent
Almohsin et al.

(10) Patent No.: US 11,802,232 B2
(45) Date of Patent: Oct. 31, 2023

(54) POLYMER-NANOFILLER HYDROGELS

(71) Applicant: Saudi Arabian Oil Company, Dhahran (SA)

(72) Inventors: Ayman Almohsin, Doha (SA); Edreese Alsharaeh, Riyadh (SA); Feven Mattews Michael, Riyadh (SA); Mohan Raj Krishnan, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 42 days.

(21) Appl. No.: 17/197,685

(22) Filed: Mar. 10, 2021

(65) Prior Publication Data

US 2022/0290033 A1  Sep. 15, 2022

(51) Int. Cl.
| | | |
|---|---|---|
| *C09K 8/512* | (2006.01) | |
| *C09K 8/516* | (2006.01) | |
| *E21B 21/00* | (2006.01) | |
| *E21B 33/138* | (2006.01) | |

(52) U.S. Cl.
CPC .............. *C09K 8/512* (2013.01); *C09K 8/516* (2013.01); *E21B 21/003* (2013.01); *E21B 33/138* (2013.01); *C09K 2208/10* (2013.01)

(58) Field of Classification Search
CPC .. C09K 2208/10; C09K 8/5045; C09K 8/512; C09K 8/516; E21B 21/003; E21B 21/138
See application file for complete search history.

(56) References Cited

U.S. PATENT DOCUMENTS

| | | | |
|---|---|---|---|
| 796,909 A | 8/1905 | Hardison | |
| 2,229,177 A | 1/1941 | Kennedy et al. | |
| 2,630,410 A | 3/1953 | Clapsadle et al. | |
| 3,629,102 A | 12/1971 | Lummus et al. | |
| 3,708,428 A | 1/1973 | McDonald | |
| 3,713,489 A | 1/1973 | Fast et al. | |
| 4,043,921 A * | 8/1977 | Hessert .................. | C09K 8/512 507/131 |
| 4,561,502 A * | 12/1985 | Norton .................. | C09K 8/588 507/903 |
| 4,624,870 A | 11/1986 | Anthony | |
| 4,665,984 A | 5/1987 | Hayashi et al. | |
| 4,732,213 A | 3/1988 | Bennett et al. | |
| 4,809,781 A | 3/1989 | Hoefner | |

(Continued)

FOREIGN PATENT DOCUMENTS

| | | |
|---|---|---|
| CA | 3063594 | 11/2018 |
| CN | 1221445 | 6/1999 |

(Continued)

OTHER PUBLICATIONS

Liu et al, Study on a novel crosslinked polymer gel strengthened with silica nanoparticles, Energy Fuels, 2017, 31, 9152-9161 (Year: 2017).*

(Continued)

*Primary Examiner* — Alicia Bland
(74) *Attorney, Agent, or Firm* — Fish & Richardson P.C.

(57) ABSTRACT

A polymer-nanofiller hydrogel including polymer hydrogel and nanofiller. The nanofiller is or includes nanosand. A method for forming the polymer-nanofiller hydrogel. A method of treating a wellbore in a subterranean formation, including applying a polymer-nanofiller hydrogel to the wellbore.

16 Claims, 13 Drawing Sheets

(56) References Cited

U.S. PATENT DOCUMENTS

| | | |
|---|---|---|
| 4,901,797 A | 2/1990 | Summers et al. |
| 4,927,749 A | 5/1990 | Dorn |
| 5,125,456 A | 6/1992 | Hutchins et al. |
| 5,168,928 A | 12/1992 | Terry et al. |
| 5,178,217 A | 1/1993 | Mohammadi et al. |
| 5,185,024 A | 2/1993 | Siemer et al. |
| 5,320,171 A | 6/1994 | Laramay |
| 5,351,757 A | 10/1994 | Chou et al. |
| 5,368,833 A | 11/1994 | Johansson et al. |
| 5,617,920 A | 4/1997 | Dovan et al. |
| 5,697,441 A | 12/1997 | Vercaemer |
| 5,836,390 A | 11/1998 | Apps et al. |
| 5,957,203 A | 9/1999 | Hutchins et al. |
| 6,516,885 B1 | 2/2003 | Munday |
| 7,013,973 B2 | 3/2006 | Danican et al. |
| 7,273,101 B2 | 9/2007 | Davies et al. |
| 7,458,424 B2 | 12/2008 | Odeh et al. |
| 7,562,710 B2 | 7/2009 | Buchanan |
| 7,677,313 B2 | 3/2010 | Tremblay et al. |
| 7,712,528 B2 | 5/2010 | Langdon |
| 7,854,277 B2 | 12/2010 | Duncum et al. |
| 7,934,557 B2 | 5/2011 | Nguyen |
| 7,954,549 B2 | 6/2011 | Lende et al. |
| 7,985,789 B2 | 7/2011 | Albalat Perez et al. |
| 8,053,479 B2 | 11/2011 | Masuda et al. |
| 8,132,623 B2 | 3/2012 | Allin et al. |
| 8,557,916 B1 | 10/2013 | Alsharaeh et al. |
| 8,672,023 B2 | 3/2014 | O'Malley et al. |
| 8,822,386 B2 | 9/2014 | Quintero et al. |
| 8,853,301 B2 | 10/2014 | Jing et al. |
| 9,045,965 B2 | 6/2015 | Patil et al. |
| 9,133,386 B2 | 9/2015 | Kumar et al. |
| 9,315,721 B2 | 4/2016 | Mahoney et al. |
| 9,464,504 B2 | 10/2016 | Kakdjian et al. |
| 9,475,981 B2 | 10/2016 | Abivin et al. |
| 9,550,879 B2 * | 1/2017 | Donovan ............... B01J 20/12 |
| 9,932,521 B2 | 4/2018 | Soane et al. |
| 9,951,593 B2 | 4/2018 | Hussein et al. |
| 10,683,726 B1 | 6/2020 | Al-Mulhenn et al. |
| 10,920,063 B2 | 2/2021 | Almohsin et al. |
| 2004/0154799 A1 | 8/2004 | Powell |
| 2004/0157749 A1 | 8/2004 | Ely et al. |
| 2006/0289160 A1 * | 12/2006 | van Batenburg ........ C09K 8/80 |
| | | 507/924 |
| 2007/0029085 A1 | 2/2007 | Panga et al. |
| 2008/0035343 A1 | 2/2008 | Odeh et al. |
| 2008/0289812 A1 | 11/2008 | El-Khazindar et al. |
| 2009/0010364 A1 | 4/2009 | Schafer et al. |
| 2009/0205818 A1 | 8/2009 | Klunge et al. |
| 2009/0221453 A1 | 9/2009 | Mukhopadhyay et al. |
| 2010/0055458 A1 | 3/2010 | Jang et al. |
| 2010/0096139 A1 | 4/2010 | Holcomb |
| 2010/0119850 A1 | 5/2010 | Browne et al. |
| 2010/0230169 A1 | 9/2010 | Pomerleau |
| 2010/0252259 A1 | 10/2010 | Horton |
| 2011/0094746 A1 | 4/2011 | Allison et al. |
| 2012/0103607 A1 | 5/2012 | Fitzpatrick |
| 2012/0255887 A1 | 10/2012 | Holms et al. |
| 2013/0065798 A1 | 3/2013 | Amanullah et al. |
| 2013/0149211 A1 | 6/2013 | Bielawski et al. |
| 2013/0166156 A1 | 6/2013 | Lin |
| 2013/0317135 A1 | 11/2013 | Vega |
| 2014/0144637 A1 | 5/2014 | Gerrard |
| 2014/0158354 A1 | 6/2014 | Kumar et al. |
| 2015/0027710 A1 | 1/2015 | Miller |
| 2015/0159079 A1 | 6/2015 | Huh et al. |
| 2015/0322328 A1 | 11/2015 | Boul et al. |
| 2015/0344765 A1 | 12/2015 | Kumar et al. |
| 2016/0304772 A1 | 10/2016 | Al-Harbi |
| 2016/0344035 A1 | 11/2016 | Zhamu et al. |
| 2017/0058186 A1 | 3/2017 | Oghena |
| 2017/0206997 A1 * | 7/2017 | Al-Harthi ............... C08J 5/18 |
| 2018/0163122 A1 | 6/2018 | Panga et al. |
| 2018/0193261 A1 | 7/2018 | Lee et al. |
| 2018/0327648 A1 | 11/2018 | Bataweel et al. |
| 2019/0112468 A1 | 4/2019 | Almohsin et al. |
| 2019/0256770 A1 | 8/2019 | He et al. |
| 2020/0048527 A1 | 2/2020 | Bataweel et al. |
| 2020/0071599 A1 * | 3/2020 | Ghebremeskel ......... C08J 3/12 |
| 2021/0130555 A1 | 5/2021 | Almohsin et al. |

FOREIGN PATENT DOCUMENTS

| | | |
|---|---|---|
| CN | 1745157 | 3/2006 |
| CN | 104449631 | 3/2015 |
| CN | 105755185 | 7/2016 |
| CN | 105801783 | 7/2016 |
| CN | 105924599 | 9/2016 |
| CN | 107814869 | 3/2018 |
| EP | 1866518 | 12/2007 |
| EP | 2454446 | 5/2012 |
| EP | 3331964 | 6/2018 |
| GB | 2106956 | 4/1983 |
| GB | 2503627 | 1/2014 |
| GB | 2506603 | 4/2014 |
| JP | 2005526887 | 9/2005 |
| RU | 2152967 | 7/2000 |
| RU | 2001132070 | 3/2004 |
| RU | 2008116114 | 10/2009 |
| RU | 2010130026 | 1/2012 |
| WO | WO 199500739 | 1/1995 |
| WO | WO 199837014 | 8/1998 |
| WO | WO 199936359 | 7/1999 |
| WO | WO 2003033618 | 4/2003 |
| WO | WO 2004018381 | 3/2004 |
| WO | WO 2004035473 | 4/2004 |
| WO | WO 2004035474 | 4/2004 |
| WO | WO 2007017806 | 2/2007 |
| WO | WO 2008118239 | 10/2008 |
| WO | WO 2009034287 | 3/2009 |
| WO | WO 2010070600 | 6/2010 |
| WO | WO 2013107789 | 7/2013 |
| WO | WO 2014085770 | 6/2014 |
| WO | WO 2015124214 | 8/2015 |
| WO | WO 2019075314 | 4/2019 |

OTHER PUBLICATIONS

GZ industrial Supplies, "The purpose of Nitrogen gas purging" 10 pages, Feb. 14, 2020 (Year: 2020).*

Rizlan et al, Mechanical Milling of Tronoh silica sand nanoparticles using lowspeed ball milling process, RSM2013 Proc. 2013, Langkawi, Malaysia 278-280 (Year: 2013).*

Liu et al, New insights into the hydroquinone (HQ)-hexamethylenetetramine (HMTA) gel system for water shut-off treatment in high temperature reservoirs, Journal of Industrial and Engineering Chemistry, 35, 2016, 20-28 (Year: 2016).*

PCT International Search Report and Written Opinion in International Appln. No. PCT/US2022/019294, dated Jun. 20, 2022, 14 pages.

Liu et al., "Study on a Novel Cross-Linked Polymer Gel Strengthened with Silica Nanoparticles," Energy & Fuels, Aug. 2017 31(9), 33 pages.

Hu et al., "Aqueous compatible boron nitride nanosheets for high-performance hydrogels," Nanoscale, Jan. 2016, 8(1): 4260-4266, 7 pages.

Aimohsin et al., "Nanosilica Based Fluid System for Water Shut-Off," Jul. 2017.

Al-Ghazal et al., "A new temporary chemical packer enables efficient stimulation of a lower zone in a HPHT gas well," SPE 161651, presented at the Abu Dhabi International Petroleum Exhibition and Conference on Nov. 11-14, 2012, 6 pages.

Al-Muntasheri et al., "Investigation of a High Temperature Organic Water Shutoff Gel: Reaction Mechanisms," SPE 97530, presented at the SPE International Improved Oil Recovery Conference, Dec. 5-6, 2005, 9 pages.

Alsharaeh et al., "Evaluation of Nanomechanical Properties of (Styrene—Methyl Methacrylate) Copolymer Composites Containing Graphene Sheets," American Chemical Society, Ind. Eng. Chem. Res., 2013, 52: 17871-17881, 11 pages.

(56) References Cited

OTHER PUBLICATIONS

Alsharaeh et al., "Microwave Irradiation Effect on the Dispersion and Thermal Stability of RGO Nanosheets within a Polystyrene Matrix," Materials, Jul. 2014, 7: 5212-5224, 23 pages.
Bai et al., "Case Study on Preformed Particle Gel for In-depth Fluid Diversion," SPE 113997, proceedings from the SPE/DOE Improved Oil Recovery Symposium, Apr. 19-23, 2008, 18 pages.
Chen et al., "Polyacrylamide and its derivatives for oil recovery," Dissertation for the degree of Doctor of Philosophy, Missouri University of Science and Technology, Fall 2016, 226 pages.
Dalrymple, "SPE 29194: [5]P14 Water Control Treatment Design Technology," proceedings of the 15th World Petroleum Congress, Oct. 12-17, 1997, 3 pages.
Dovan et al., "Delaying Gelation of Aqueous Polymers at Elevated Temperatures Using Novel Organic Crosslinkers," SPE-37246-MS, Society of Petroleum Engineers, presented at the International Symposium on Oilfield Chemistiy, Feb. 18-21, 1997, 11 pages.
Esmaeilzadeh et al., "Wettability alteration of carbonate rocks from liquid-wetting to ultra gas-wetting using TiO2, SiO2 and CNT nanofluids containing flurorchemicals, for enhanced gas recovery," Journal of Natural Gas Science and Engineering, vol. 26, Sep. 2015, 12 pages.
Freyer et al., "Swelling Packer for Zonal Isolation in Open Hole Screen Completions," SPE 78312, presented at the SPE 13th European Petroleum Conference, Oct. 29-31, 2002, 5 pages.
Gilardo et al., "Wettability alteration of sandstone cores by alumina-based nanofluids," Energy and Fuels, vol. 27, No. 7, Jul. 18, 2013, 7 pages.
Greenwood and Gevert, "Aqueous silane modified silica sols: theory and preparation," Pigment and Resin Technology, vol. 40, Issue 5, 2011, 10 pages.
Gunnarsson et al., "Technology Update: New Tool and Sealant Technology Expedites Annular Isolation Tasks," Society of Petroleum Engineers, Jul. 2016, 2 pages.
Huang et al., "Systematic Approach to Develop a Colloidal Silica Based Gel System for Water Shut-Off," SPE-183942-MS, Mar. 9, 2017, 19 pages.
Iler and Dalton, "Degree of Hydration of Particles of Colloidal Silica in Aqueous Solution," Journal of Physical Chemistry, vol. 60, Issue 7, Jul. 1956, 3 pages.
Iler, "The Chemistry of Silica," John Wiley & Sons, Jun. 1979, 5 pages.
Khan et al., "Graphene based metal and metal oxide nanocomposites: synthesis, properties and their applications," Journal of Materials Chemistry A, vol. 3, No. 37, Jan. 1, 2015, 57 pages.
Kondiparty et al., "Dynamic Spreading of Nanofluids on Solids. Part 1: Experimental," American Chemical Society, Langmuir vol. 28, Sep. 11, 2012, 6 pages.
Kumar et al., "Nanostructured zirconia decorated reduced graphene oxide based efficient biosensing platform for non-invasive oral cancer detection," Biosensors and Bioelectronics, vol. 78, Apr. 1, 2016, 8 pages.
Li et al., "Fabrication and properties of machinable 3Y-ZrO"2/BN nanocomposites," Materials Science and Engineering: A, Elsevier, Amsterdam, vol. 397, No. 1-2, Apr. 25, 2005, 6 pages.
Ligthelm, "SPE 68978: Water Shut-off in Gas Wells: Is there Scope for a Chemical Treatment?," presented at the SPE European Formation Damage Conference, May 21-22, 2001, 10 pages.
Liu et al., "Microwave-assisted synthesis of TiO2-reduced graphene oxide composites for the photocatalytic reduction of Cr(vi)," RSC Advances, vol. 1, No. 7, Jan. 1, 2011, 5 pages.
Liu et al., "Photolatently modulable hydrogels using unilamellar titania nanosheets as photocatalytic crosslinkers," Nature Communications, vol. 4, No. 1, Jun. 18, 2013, 7 pages.
Liu et al., "Tough and highly stretchable graphene oxide/polyacrylamide nanocomosite hydrogels," Journal of Materials Chemistry, vol. 22, No. 28, Jan. 1, 2012, 8 pages.

Mahdavi et al., "Polyacrylamide/reduced graphene oxide-Ag nanocomposite as highly efficient antibacterial transparent film," Iranian Chemical Society, Journal, vol. 14, No. 1, Aug. 6, 2016, 10 pages.
Michael et al., "Enhanced Polyacrylamide Polymer Gels using Zirconium Hydroxide Nanoparticles from Water Shutoff at High Temperatures: The Thermal and Rheological Investigations," Ind. Eng. Chem. Res., vol. 57, No. 48, Nov. 6, 2018, 27 pages.
Mordina et al., "Impact of graphene oxide on the magnetorheological behaviour of BaFe12O19nanoparticles filled polyacrylamide hydrogel," Polymer, Elsevier Science Publishers B.V., GB, vol. 97, May 11, 2016, 15 pages.
Nasr-El-Din and Taylor, "Evaluation of sodium silicate/urea gels used for water shut-off treatments," Journal of Petroleum Science and Engineering vol. 48, Issue 3-4, Sep. 15, 2005, 20 pages.
Ogolo et al., "SPE: 160847: Enhanced Oil Recovery Using Nanoparticles," SPE International, presented at the SPE Saudi Arabia Section Technical Symposium and Exhibition, Apr. 8-11, 2012, 9 pages.
Pan et al., "Tough, Stretchable, Compressive, Novel Polymer/Graphene Oxide Nanocomposite Hydrogels with Excellent Self-Healing Performance," ACS Applied Materials and Interfaces, published online Oct. 11, 2017, 28 pages.
Pham et al., "Rheological evaluation of a sodium silicate gel system for water management in mature, naturally-fractured oilfields," Journal of Petroleum Science and Engineering, vol. 138, Dec. 4, 2015, 16 pages.
Sears, "Determination of Specific Surface Area of Colloidal Silica by Titration with Sodium Hydroxide," Analytical Chemistry vol. 28, Issue 12, Dec. 1956, 3 pages.
Sepehrinia and Mohammadi, "Wettability alteration properties of fluorinated silica nanoparticles in liquid-loaded pores: An atomistic simulation," Applied Surface Science vol. 371, May 15, 2016, 11 pages.
Seright, "SPE 80200: Washout of Cr (III)-Acetate-HPAM Gels from Fractures," proceedings from the SPE International Symposium on Oilfield Chemistry, Feb. 5-7, 2003, 10 pages.
Shan et al., "Graphene oxide enhanced polyacrylamide-alginate aerogels catalysts," Carbohydrate Polymers, vol. 203, Jan. 1, 2019, 26 pages.
Song et al., "Plasma-induced grafting polyacrylamide on graphene oxide nanosheets for simultaneous removal of radionuclides," Physical Chemistry Chemical Physics (RSC Publishing), Jan. 1, 2015, 24 pages.
Stengl et al., "h-BN-TiO 2 Nanocomposite for Photocatalytic Applications," Journal of Nanomaterials, vol. 2016, Jan. 1, 2016, 12 pages.
Taha and Lee, "Nano Graphene Application Improving Drilling Fluids and performance," IPTC 18539-MS, presented at the International Petroleum Technology Conference, Dec. 6-9, 2015, 16 pages.
Taha et al., "Overview of Water Shutoff Operations in Oil and Gas Wells; Chemical and Mechanical Solutions," chemengineering MDPI, Department of Petroleum Engineering, Texas A&M University at Qatar, May 2019, 3(2), 51, 11 pages.
Target Intervention No., "Real-Time, Fully Electric TP1 Straddle Tool," targetinvention.no, available on or before Feb. 13, 2018, 1 page.
Tongwa et al., "Evaluation of a Nanocomposite Hydrogel for Water Shut-Off in Enhanced Oil Recovery Applications: Design, Synthesis and Characterization," Journal of Applied Polymer Science, Jul. 17, 2012, 128:787-794, 8 pages.
Veil et al., "A White Paper Describing Produced Water from Production of Crude Oil, natural Gas and Coal Bed methane," Technical Report prepared for the National Energy Technology Laboratory (US DOE, under Contract No. W-31-109-Eng-38, Jan. 2004, 87 pages.
Villamizar et al., "SPE 129901: Interfacially Active SWNT/Silica Nanohybrid Used In Enhanced Oil Recovery," SPE International, presented at the 2010 SPE Improved Oil Recovery Symposium, Apr. 26-28, 2010, 11 pages.
Wu et al., "Poly(2-acrylamide-2-methylpropanesulfonic acid)-modified SiO 2 Nanoparticles for Water-based Muds," American

(56) References Cited

OTHER PUBLICATIONS

Chemical Society—Industrial and Engineering Chemistry Research, vol. 56, No. 1, Dec. 20, 2016, 7 pages.

Zhang et al., "Engineering the Unique 2D Mat of Graphene to Achieve Graphene-TiO 2 Nanocomposite for Photocatalytic Selective Transformation: What Advantage does Graphene Have over Its Forebear Carbon Nanotube?" ACS NANO, vol. 5, No. 9, Sep. 27, 2011, 10 pages.

Zhang et al., "TiO 2 -Graphene Nanocomposites for Gas-Phase Photocatalyptic Degradation of Volatile Aromatic Pollutant: Is TiO 2 -Graphene Turley Different from Other TiO 2 -Carbon Composite Materials?" ACS NANO, vol. 4, No. 12, Dec. 28, 2010, 12 pages.

Zhou et al., "Preparation of a reduced graphene oxide/zirconia nanocomposite and its application as a novel lubricant oil additive," RSC Advances, vol. 5, No. 111, Jan. 1, 2015, 11 pages.

Zolfaghari et al., "Preparation and characterization of nanocomposite hydrogels based on polyacrylamide for enhanced oil recovery applications," J. Appl. Polym. Sci., 2006, 100:2096-2103, 11 pages.

EP Examination Report in European Appln. No. EP 17175344.5-1354, dated Nov. 10, 2017, 6 pages.

\* cited by examiner

US 11,802,232 B2

POLYMER-NANOFILLER HYDROGELS

TECHNICAL FIELD

This disclosure relates to composites of polymer and nanofiller (e.g., nanosand) as hydrogels, and application of the hydrogels in treatment in a wellbore in a subterranean formation.

BACKGROUND

Different types of treatments may be applied to a wellbore in a subterranean formation in the Earth crust. The wellbore treatments may be to facilitate production of hydrocarbon, such as crude oil or natural gas, from the subterranean formation. The treatments of the wellbore may treat the subterranean formation. A treatment may include forming or extending the wellbore. A borehole or wellbore may be drilled into a subterranean formation (hydrocarbon formation or reservoir) in the Earth for the exploration or production of crude oil and natural gas. A drill bit and drilling fluid may be employed.

A wellbore treatment may include to treat problematic sections of a wellbore. An example of a problematic section of a wellbore is a water zone in which water enters the wellbore from the hydrocarbon formation or underlying water aquifer. The influx of water into the wellbore during drilling and during the subsequent production of oil and gas can add cost. The production of water along with the oil and gas from the hydrocarbon formation can lead to surface processing of the water and injection of the water back into the hydrocarbon formation for disposal or pressure maintenance. Such processing and injection of water produced from the wellbore water zone causes increased costs of the oil and gas production. Another example of a problematic section of a wellbore is a loss circulation zone. In oil or gas well drilling, loss circulation occurs when drilling fluid (mud) or cement slurry flows into the subterranean formation instead of flowing up the annulus between the formation and the casing or work string. Loss circulation is the partial or complete loss of drilling fluid or cement slurry to the formation during drilling or cementing operations. Loss circulation can be brought on by natural or induced causes. Natural causes include naturally fractured formations or unconsolidated zones. Induced losses occur when the hydrostatic fluid column pressure exceeds the fracture gradient of the formation and the formation pores break down adequately to receive rather than resist the fluid. For non-cavernous formations, a loss circulation zone may be the result of fractures in the geological formation at the borehole or wellbore. When loss circulation occurs, both drilling fluid and cement slurry can be lost.

A wellbore treatment may include hydraulic fracturing, which may be a treatment of the subterranean formation through the wellbore. Hydraulic fracturing employs fluid and material to generate fractures in a subterranean formation to stimulate production from oil and gas wells. The process can involve the pressure injection of fracturing fluid into a wellbore to generate cracks or fractures in the rock formations through which natural gas, petroleum, and brine will flow more freely. Proppant may be employed to maintain the fractures as pressure depletes in the well during hydrocarbon production. The proppant may resist formation closure stresses to keep fractures open. There are many other wellbore treatments.

SUMMARY

An aspect relates to a method of treating a wellbore in a subterranean formation, including applying a polymer-nanofiller hydrogel to the wellbore. The polymer-nanofiller hydrogel includes polymer hydrogel and nanofiller. The polymer hydrogel includes crosslinked polymer in water. The nanofiller is nanosand or includes nanosand.

Another aspect is a method of forming a polymer-nanofiller hydrogel. The method includes dispersing nanofiller in water and adding polymer and crosslinker to the water to give a mixture including the polymer, the crosslinker, the nanofiller, and the water. The nanofiller is nanosand or includes nanosand. The method includes heating the mixture to crosslink the polymer to give crosslinked polymer. The polymer-nanofiller hydrogel includes the nanofiller and polymer hydrogel. The polymer hydrogel includes the crosslinked polymer and the water.

Yet another aspect relates to a polymer-nanofiller hydrogel including polymer hydrogel and nanofiller. The polymer hydrogel includes crosslinked polymer in water. The nanofiller is or includes nanosand.

The details of one or more implementations are set forth in the accompanying drawings and the description below. Other features and advantages will be apparent from the description and drawings, and from the claims.

DETAILED DESCRIPTION

Figure 1:
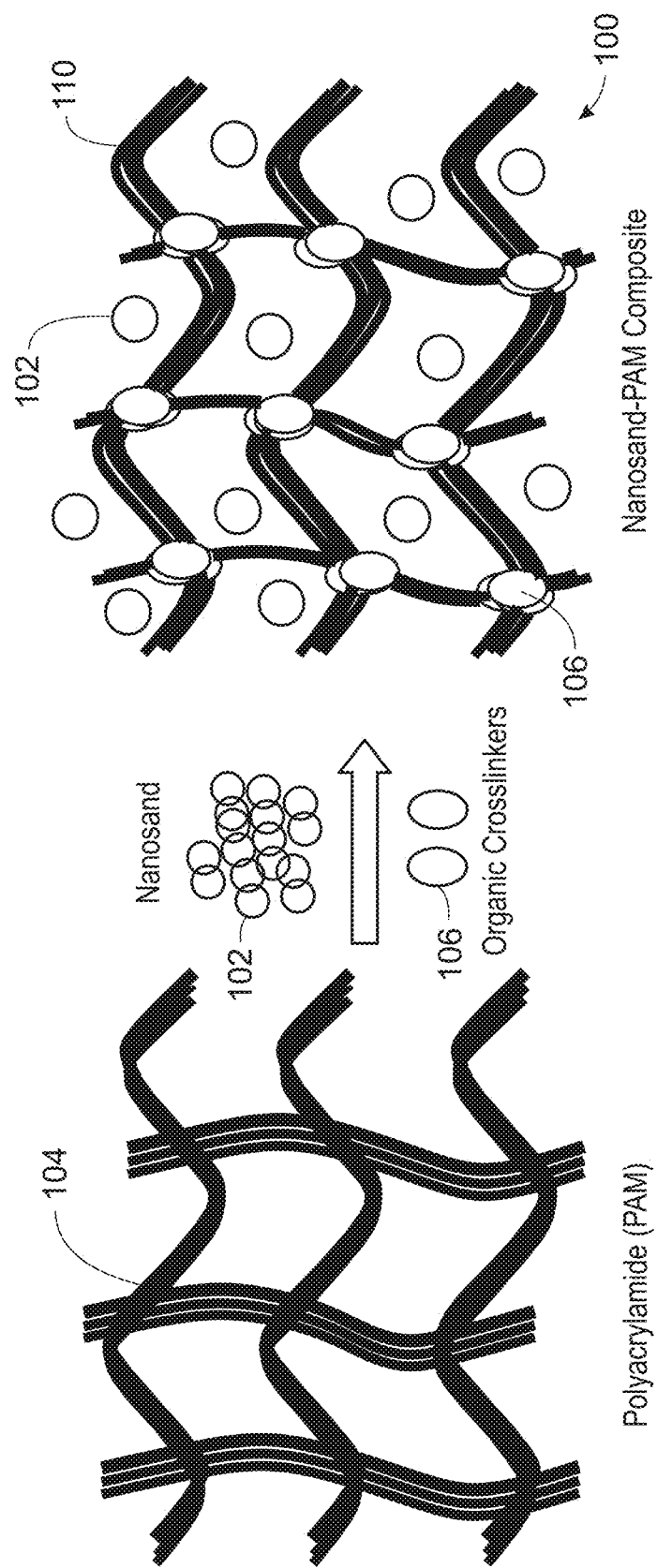
FIG. 1 is a diagram of formation of a nanofiller-polymer composite as nanofiller-polymer hydrogel (e.g., nanosand-PAM hydrogel) that is a nanofiller-polymer matrix (nanofiller-reinforced polymer).

Some aspects of the present disclosure are directed to polymer-nanofiller composite hydrogel that includes a polymer hydrogel and nanofiller. The nanofiller includes nanosand. The polymer hydrogel is crosslinked polymer in water. The crosslinked polymer may be reinforced with the nanofiller. The polymer-nanofiller hydrogel may be a core-shell structure in which the polymer hydrogel (having the crosslinked polymer) is the shell and the nanofiller is the core.

Some aspects of the present disclosure are directed to utilizing polymer-nanosand composites for treatments (e.g., water shutoff) in a wellbore in a subterranean formation. The polymer may be crosslinked polymer. The polymer-nanosand composite may be crosslinked polymer (e.g., polyacrylamide) combined with nanosand. The polymer-nanosand composite may be or in a polymer hydrogel having the crosslinked polymer and water, and incorporating the nanosand. The polymer-nanosand composite may be characterized, for example, as nanosand-reinforced polymer, polymer-nanosand gel, polymer-nanosand hydrogel, and the like. The crosslinked polymer may be a polymer matrix and in which the nanosand is nanofiller in the polymer matrix (which can give a nanosand-reinforced polymer composite gel). The polymer gel may instead be a polymer shell and in which the nanosand is a core. Enhancement in thermal and mechanical properties may be found with the nanosand-reinforced polymer as compared to neat polymer counterparts.

The polymer-nanosand composite (including as polymer-nanosand hydrogel) may be prepared by in-situ techniques. The in-situ synthesis may form the polymer-nanosand composite. The polymer may include polyacrylamide (PAM). The nanosand (e.g., obtained by ball milling sand) may be utilized as nanofiller for a polymer matrix or as a core for a polymer shell. Nanosheets, such as hexagonal boron nitride nanosheets, may be included as nanofiller with the nanosand. The hexagonal boron nitride may be labeled as hBN or BN, and may be nanosheets. The hexagonal boron nitride nanosheets may be ball milled into smaller hexagonal boron nitride nanosheets.

The polymer-nanosand composite composition may be adjusted to achieve specified or desired thermal stability and rheological properties of the polymer-nanosand composite and associated hydrogel. The thermal and mechanical properties of the prepared polymer-nanosand composite in the hydrogels may be evaluated, for example, utilizing differential scanning calorimetry (DSC), thermos-gravimetric analysis (TGA), and dynamic mechanical analysis (DMA). Again, the thermal and mechanical properties of the nanosand-reinforced polymer composites may be improved as compared to the polymer alone.

Conventional polymer-based gel systems for water shutoff treatment in a wellbore in a subterranean formation may degrade at a significant rate over time due to the high temperature, pressure, and salinity of the subterranean formation. Embodiments of nanosand-polymer composites herein may have a high thermal degradation temperature (e.g., greater than 175° C.) with beneficial mechanical, thermal, and rheological properties, and give improved water shut-off. Also, the cost of raw materials may be lower than conventional because the nanosand filler is prepared from sand. The nanosand-polymer composites are polymer hydrogel composites. They may be composites of nanosand and polymer hydrogel. They may be composites of nanosand and crosslinked polymer in the polymer hydrogel. The nanosand-polymer composites are nanosand-polymer hydrogels which include polymer hydrogel and nanofiller. The polymer hydrogel is crosslinked polymer in water. Additional nanomaterials may be included as nanofiller with the nanosand in the polymer hydrogel composites.

As used herein, the term "nanosand-polymer" is the same as "polymer-nanosand." The term "nanosand-PAM" is the same as "PAM-nanosand." The term "nanofiller-polymer" is the same as "polymer-nanofiller." The term "nanofiller-PAM" is the same as "PAM-nanofiller." Further, for embodiments in which the nanofiller is or includes nanosand, the term "nanofiller-polymer" may encompass "nanosand-polymer." For embodiments in which the nanofiller includes only nanosand, the term "nanosand-polymer" may be equivalent with "nanofiller-polymer." Furthermore, the term "composite" for polymer and nanofiller (e.g., nanosand) may be in the context of the polymer as crosslinked and combined with the nanofiller (e.g., nanosand). Such a "composite" for polymer and nanofiller may be a hydrogel in the context that the crosslinked polymer is in water giving a polymer hydrogel.

Embodiments of the nanosand-polymer composites disclosed herein may be utilized in treatments in a wellbore in a subterranean formation. The treatments may address excess water production or loss circulation by employing the nanosand-polymer composites to plug formation permeability. The treatments in the wellbore and subterranean formation may be drilling or hydraulic fracturing. The nanosand-polymer composites as hydrogels may be added to the drilling fluid or fracturing fluid to alter properties of the drilling fluid or fracturing fluid.

The nanosand-polymer composite in water with nanosand as nanofiller and/or crosslinker may be a smart hydrogel for water shutoff treatment or curing loss circulation in a wellbore. The smart hydrogel may have relatively high temperature stability and be mechanically stable. Smart hydrogels as stimuli-responsive hydrogels may be three-dimensional networks composed of crosslinked hydrophilic polymer chains able to change their volume and other properties in response to environmental stimuli such as temperature, pH, and certain chemicals.

The nanosand-polymer composites (polymer-nanosand hydrogels) may be cost-effective in the sense that sand can be abundantly available, especially in certain regions of the world. The nanosand in the nanosand-polymer composite may be prepared by milling sand, such as silica sand that is primarily silicon dioxide (quartz). In some instances, the sand to be milled is natural desert sand obtained from Saudi Arabia. The milling of the sand may involve, for example, ball milling the sand for several hours. In implementations, the particle size of the nanosand may generally be less than 100 nanometers (nm).

The polymer in the nanosand-polymer composites (polymer-nanosand hydrogels or polymer-nanofiller hydrogels more generally) may be, for example, polyacrylamide (PAM) or polystyrene-polymethylmethacrylate (PS-PMMA) copolymer. If employed, the PS-PMMA may be crosslinked, such as with divinylbenzene (DVB) and thus noted as PS-PMMA/DVB. The cross-linked PS-PMMA/DVB may be formed by bulk polymerization of styrene (S) monomer and methyl methacrylate (MMA) monomer in the presence of DVB. Other polymers are applicable. For instance, other polymers forming the nanofiller (nanosand)-polymer composites (hydrogels) can include, for example, copolymers of methyl styrene, vinyl toluene, fluoro styrene with methacrylic acid (MAA), butyl methacrylate (BMA), and hydroxylethyl methacrylate (HEMA) that are crosslinked with DVB.

The nanosand-polymer composites may be prepared through the in-situ method. The in-situ synthesis solution may be primarily water or other solvent. The water may be fresh water, groundwater, seawater, brine or saline water, and so forth. In implementations, the solution may be sonicated to disperse the nanosand. The in-situ synthesis solution may include the polymer, nanosand, crosslinker, and mostly water. Nanosheets (e.g., hBN nanosheets) may be included in addition to the nanosand. Again, the hBN nanosheets may be ball milled to further reduce the size of the nanosheets. The crosslinker may be an organic crosslinker and may additionally include salt, such as potassium chloride (KCl). The in-situ synthesis solution may be heated and maintained at a specified temperature for a specified time to cure the polymer-nanosand composite, which can give beneficial thermal and mechanical properties of the polymer-nanosand composite. Again, the polymer-nanosand composite may be a hydrogel. The polymer-nanosand composite may be included with water (e.g., at least 90 wt % water) in which the polymer is crosslinked polymer in the water as polymer gel or hydrogel, and the nanofiller is nanosand with optional inclusion of hBN.

The nanofiller-polymer composite (e.g., nanosand-polymer composite) can be a nanofiller-polymer matrix (e.g., nanosand-polymer matrix). The nanofiller-polymer composite may instead be a nanofiller-polymer core-shell structure (e.g., nanosand-polymer core-shell structure). In some implementations of the in-situ synthesis, the formation of a nanofiller-polymer matrix versus a nanofiller-polymer core-shell structure may be a function of (correlative with) concentration of the polymer or the weight ratio of polymer to nanofiller (e.g., nanosand or nanosand and nanosheets) in the in-situ synthesis solution. A greater concentration of the polymer or greater weight ratio of polymer to nanofiller may lead to or give formation of a nanofiller-polymer matrix composite. A lower concentration of the polymer or lower weight ratio of polymer to nanofiller may lead to or give formation of the nanofiller-polymer core-shell structure. In some embodiments, the weight ratio of the nanofiller to the polymer may decide the final structure whether a composite or core-shell. In implementations, the weight ratio of the nanofiller to polymer may be, for example, less than 0.05 for the nanofiller-polymer matrix composite hydrogel and greater than 0.20 for the nanofiller-polymer core-shell structure. Other implementations with different numerical values are applicable.

The nanofiller-polymer composite (e.g., nanosand-polymer composite) as a nanofiller-polymer hydrogel (nanofiller-polymer composite hydrogel) may be (1) a nanofiller-polymer matrix (nanofiller-polymer composite matrix) or instead (2) a nanofiller-polymer core-shell structure (e.g., nanosand-polymer core-shell structure) in which the nanofiller is core and the polymer is shell. The nanofiller-polymer hydrogel may be a nanofiller-PAM hydrogel (e.g., nanosand-PAM hydrogel). The nanofiller-PAM hydrogel may be (1) a nanofiller-PAM matrix (e.g., nanosand-PAM matrix) or instead (2) a nanofiller-PAM core-shell structure (e.g., nanosand-PAM core-shell structure) in which the nanofiller (e.g., nanosand) is core and the PAM is shell. The nanofiller-polymer hydrogel maybe a nanofiller-PS-PMMA hydrogel. The nanofiller-PS-PMMA hydrogel may be (1) a nanofiller-PS-PMMA matrix (e.g., nanosand-PS-PMMA matrix) or instead (2) a nanofiller-PS-PMMA core-shell structure (e.g., nanosand-PS-PMMA core-shell structure) in which the nanofiller (e.g., nanosand) is core and the PS-PMMA is shell. The PS-PMMA may be PS-PMMA/DVB.

FIG. 1 is a diagram of formation of a nanofiller-polymer composite as nanofiller-polymer hydrogel (e.g., nanosand-PAM hydrogel 100) that is a nanofiller-polymer matrix (nanofiller-reinforced polymer). The diagram depicts nanosand and PAM but may be applicable to nanofiller and polymer more generally. In implementations, the nanofiller is or includes nanosand. The diagram may represent synthesis (e.g., in-situ synthesis) performed commercially at industrial scale or as in the laboratory Example 1 below. The formation of the nanofiller-polymer hydrogel (or more particularly, nanosand-PAM hydrogel 100) may be an in-situ synthesis in a vessel.

Nanosand may be formed by milling (e.g., ball milling) or grinding sand (milling or grinding macro sand particles). In implementations, the particle size of the nanosand may generally be less than 100 nm, or in a range of 9 nm to 100 nm.

As discussed below, the nanosand is mixed with a polymer (e.g., PAM) solution and the polymer crosslinked at a curing temperature. The curing (crosslinking) may gel the polymer solution giving polymer gel or hydrogel. The curing generally does not include polymerization. In alternate implementations, including with other polymers, polymerization may occur in addition to the curing.

To prepare the nanofiller-polymer hydrogel, nanofiller 102 is added to solvent (e.g., water) in a vessel. The nanofiller 102 is nanosand as depicted or may include both nanosand and nanosheets (e.g., hBN nanosheets). The concentration of the nanofiller 102 in the solvent may be less than 2 wt %, less than 1 wt %, less than 0.2 wt %, at least 0.2 wt %, or in ranges of 0.05 wt % to 1.5 wt % or 0.1 wt % to 0.8 wt %. The nanofiller 102 and solvent may be mixed (e.g., sonicated, stirred mixer, etc.) in the vessel to disperse the nanofiller 102 in the solvent.

Polymer may be added. The polymer, solvent, and nanosand may be mixed in the vessel, such as via a stirred mixer, agitator, blender, etc., to give a mixture (solution). The polymer may be at a concentration in the mixture, for example, of at least 4 wt %, less than 4 wt %, or in ranges of 1 wt % to 10 wt %, 1 wt % to 9 wt %, 1.5 wt % to 8 wt %, or 2 wt % to 6 wt %. In implementations, the polymer may be low molecular-weight PAM 104. The PAM 104 molecular weight may be, for example, less than 1,600,000 Daltons. The weight ratio of the nanofiller 102 (e.g., nanosand) to the polymer (e.g., PAM) may generally be less than 0.05.

Organic crosslinker(s) 106 may be added, for example, at a total concentration of 0.3 wt % to 1 wt % in the solvent. The crosslinker 106 may be, for example, hydroquinone (HQ) or hexamethylenetetramine (HMT), or both. HMT is $C_6H_{12}N_4$ and also known as hexamine. For implementations with both HQ and HMT utilized in combination, each may have a concentration in the solvent of at least 0.2 wt % or at least 0.3 wt %, or in the range of 0.1 wt % to 0.5 wt %. A salt, such as KCl, may also be added. The concentration of the salt (e.g., KCl) in the solvent may be at least 0.2 wt %, or in the range of 0.05 wt % to 0.5 wt %. The mixture of the nanofiller 102, PAM 104, organic crosslinker(s) 106, salt, and solvent may be mixed or agitated as an in-situ synthesis mixture or solution. In some implementations, the solution may be flushed or purged with an inert gas, such as nitrogen gas.

The solution may be heated to a curing temperature and maintained at the curing temperature for a curing time to crosslink the polymer to give the nanofiller-polymer hydrogel (e.g., nanosand-PAM hydrogel 100) that is a nanofiller-polymer matrix with the crosslinked polymer reinforced by the nanofiller. The heating may be, for example, by a heating jacket on the vessel that receives a heating fluid, pumped recirculation heating via a conduit through a heat exchanger (e.g., shell-and-tube heat exchanger), external electrical heaters on the vessel, and so on. The curing temperature may be at least 100° C., at least 150° C., less than 150° C., at least 175° C., or in ranges of 125° C. to 200° C. or 125° C. to 175° C. The curing time may be at least 12 hours, at least 24 hours, at least 48 hours, less than 48 hours, or in ranges of 12 hours to 60 hours or 24 hours to 48 hours. In implementations, the weight ratio of the nanofiller 102 to the polymer (e.g., PAM) in the nanofiller-polymer hydrogel (e.g., nanosand-PAM hydrogel 100) may generally be less than 0.05.

The nanosand-PAM hydrogel 100 may be crosslinked PAM 110 in water and with the PAM 110 reinforced with the nanofiller 102. The crosslinking may be promoted by the heating in the presence of the crosslinker(s) 106. For instance, as indicated, the PAM crosslinking with HQ and HMT may be achieved by heating the solution, for example, to at least 150° C. The PAM in the nanosand-PAM hydrogel 100 may be PAM gel (hydrogel) crosslinked with organic crosslinking agents HQ and HMT in presence of salt KCl. For the combined PAM and nanosand in the nanosand-PAM hydrogel 100, the PAM may be, for example, at least 98 wt % of the combined PAM and nanosand. The nanosand may be, for example, less than 2 wt % of the combined PAM and nanosand. In implementations, at least 90 wt % (or at least 94 wt %) of the nanosand-PAM hydrogel 100 may be water.

In alternate embodiments, the nanosand-polymer hydrogel prepared may be nanosand-PS-PMMA/DVB hydrogel. In those embodiments, the polymer in the nanosand-polymer hydrogel is PS-PMMA crosslinked through DVB. For the PS-PMMA/DVB, the crosslinking may be carried out by mixing the styrene (S) and methylmethacrylate (MMA) co-monomers with the crosslinking agent DVB followed by in-situ bulk polymerization. The concentration of the PS-PMMA/DVB in the nanosand-PS-PMMA/DVB hydrogel may be at least 98 wt % of the combination of the nanofiller 102 and the crosslinked polymer (PS-PMMA/DVB) in the nanosand-PS-PMMA/DVB hydrogel.

Again, the nanofiller 102 may be nanosand only or a combination of nanosand and hBN (also labeled as BN). The nanofiller 102 including the nanosand may act as a reinforcing agent. The hydrogel with the nanofiller 102 may have increased thermal stability, for example, up to 175° C. The hBN if employed in addition to the sand may be two-dimensional (2D) nanofiller. The 2D-nanofiller hBN may enhance mechanical properties of the nanofiller-polymer hydrogel or the nanosand-polymer hydrogel.

Figure 2:
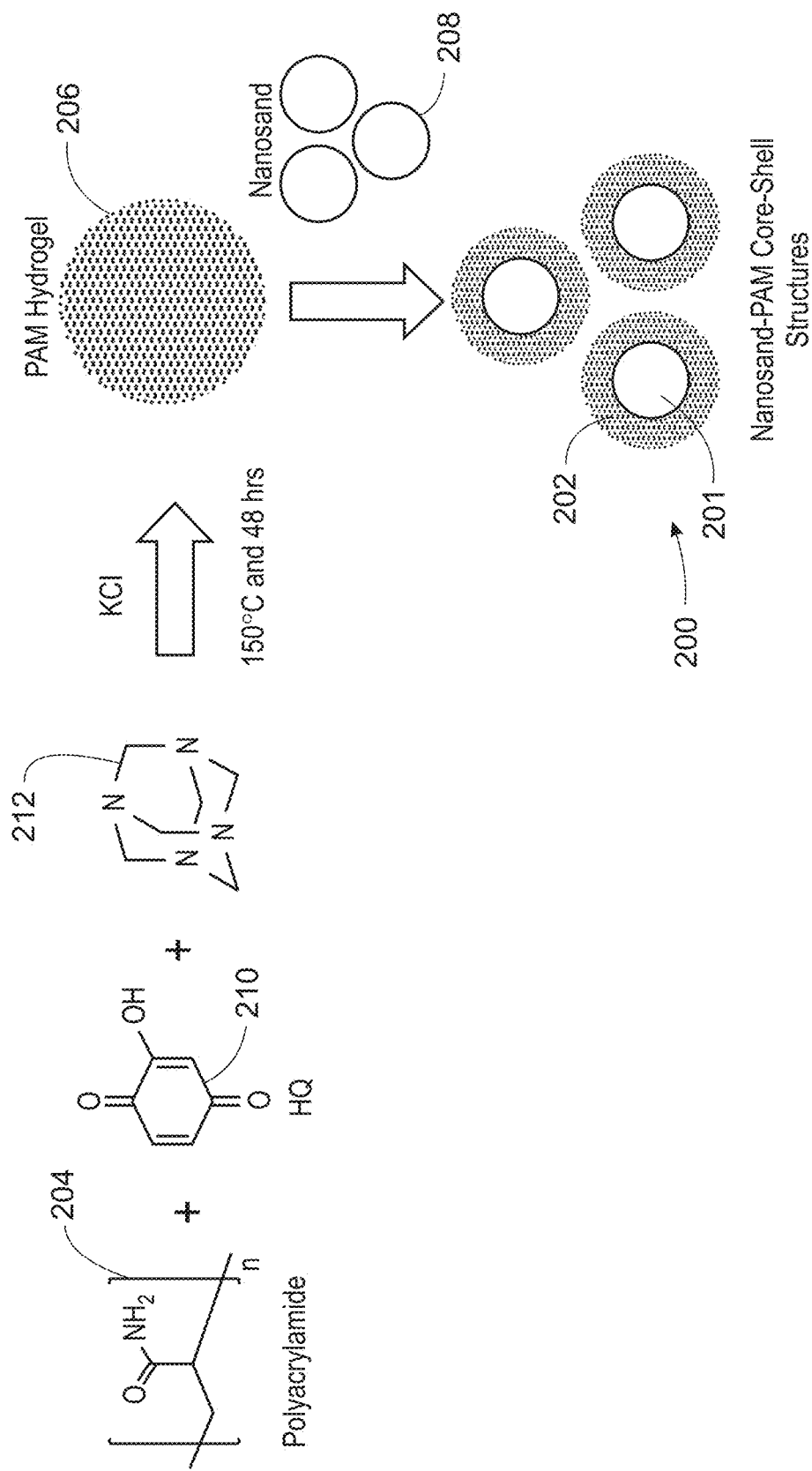
FIG. 2 is a sequence diagram of formation of a nanofiller-polymer composite (e.g., nanofiller-polymer hydrogel) that is nanofiller-polymer core-shell structure.

FIG. 2 is a sequence diagram of formation of a nanofiller-polymer composite (as a nanofiller-polymer hydrogel) that is nanofiller-polymer core-shell structure (e.g., nanosand-PAM core-shell structure 200). The core 201 may be nanofiller, such as nanosand or a combination of nanosand and hBN. The shell 202 may be PAM or PAM hydrogel. Polymers other than PAM, such as PS-PMMA or PS-PMMA/DVB, may be utilized for the nanofiller-polymer core-shell composite structure.

In the illustrated embodiment, the polymer (e.g., PAM 204 or PAM hydrogel 206) is the shell 202 and the nanofiller (e.g., nanosand 208) is the core 201. The nanosand 208 may additionally include hBN. In some implementations, the formation of the core-shell structure may be characterized as polymer (e.g., PAM) coating of the nanofiller (e.g., nanosand) carried out by mixing the PAM solution with nanosand followed by high-temperature curing (e.g., at 150° C.).

The FIG. 2 diagram may represent synthesis (e.g., in-situ synthesis) performed commercially at industrial scale or with respect to the laboratory Example 2 below. The formation of the nanofiller-polymer core-shell structure or the nanosand-polymer core-shell structure (e.g., nanosand-PAM core-shell structure 200) may be in-situ synthesis in a vessel.

A solution of polymer (e.g., PAM 204) in solvent (e.g., water) is prepared in a vessel. The PAM 204 added may be low molecular weight PAM. The PAM may be crosslinked to give the polymer hydrogel (e.g., PAM hydrogel 206). In other embodiments, the polymer may instead be PS-PMMA/DVB.

The polymer (e.g., PAM 204) may be at a concentration in the solvent (water) for example, of at least 4 wt %, less than 4 wt %, or in ranges of 1 wt % to 10 wt %, 1 wt % to 9 wt %, 1.5 wt % to 8 wt %, or 2 wt % to 6 wt %. Nanofiller (e.g., nanosand 208) may be mixed with the polymer (e.g., PAM 204) and solvent (water) in the vessel. The concentration of the nanofiller (e.g., nanosand 208) in the solvent (water) may be, for example, in a range of 0.8 wt % to 4 wt %. In implementations, the weight ratio of the nanofiller (e.g., nanosand 208) to the polymer (e.g., PAM 204) may generally be at least 0.2.

In the illustrated embodiment for the polymer as PAM, at least one of the two organic crosslinkers 210 and 212 are added. If both are added, the concentration of the combination of the two organic crosslinkers 210 and 212 in the solvent (water) may be at least 0.4 wt % or at least 0.6 wt %, or in the range of 0.2 wt % to 1 wt %. The crosslinker 210 may be HQ and the crosslinker 212 may be HMT. For the combination added, the concentration of each of HQ and HMT individually in the solvent may be at least 0.2 wt % or at least 0.3 wt %, or in the range of 0.1 wt % to 0.5 wt %. A salt, such as KCl, may also be added. The concentration of the salt (e.g., KCl) in the solvent may be at least 0.2 wt %, or in the range of 0.05 wt % to 0.5 wt %.

In the illustrated embodiment as depicted, the mixture (solution) of PAM 204, nanosand 208, crosslinker 210, crosslinker 212, and salt may be mixed and heated to a curing temperature (e.g., 150° C.). The solution (e.g., an in-situ synthesis solution) may be maintained at the curing temperature for a curing time (e.g., 48 hours). In some implementations, the solution may be flushed (purged) with an inert gas, such as nitrogen gas, prior to heating to the curing temperature. The curing temperature may be at least 100° C., at least 150° C., less than 150° C., at least 175° C., or in ranges of 125° C. to 200° C. or 125° C. to 175° C. The curing time may be at least 12 hours, at least 24 hours, at least 48 hours, less than 48 hours, or in ranges of 12 hours to 60 hours or 24 hours to 48 hours. The weight ratio of the nanofiller (e.g., nanosand 208) to the crosslinked polymer (e.g., PAM hydrogel 206) in the core-shell structure 200 may generally be at least 0.2.

Example 1

Two nanosand-polymer composites each as a nanosand-polymer matrix called a nanosand-PAM composite hydrogel were formed via the in-situ method. The nanofiller in the first hydrogel was nanosand only. The nanofiller in the second hydrogel was nanosand and hBN nanosheets. Natural sand of Saudi Arabia was obtained and ball milled to give the nanosand. Other than the nanofiller being (1) nanosand only or (2) nanosand and hBN nanosheets, the two hydrogels were identically prepared as presented below.

The nanofiller was added to 5 milliliters (ml) of distilled water at 0.2 wt % in the distilled water. The distilled water having the nanofiller was sonicated for 15 to 30 minutes (about 22 minutes) until the nanofiller was dispersed. While stirring the sonicated distilled water having the nanofiller with a magnetic bar, low molecular weight PAM was added at 4 wt % in the sonicated distilled water having the nanofiller. For instance, about 200 mg of PAM was added to 5 ml of nanofiller suspended water. The magnetic bar was added inside the beaker and the solution stirred. (The 4 wt % PAM is 4 wt % in the initial solution and can be greater than 4 wt % PAM in the final hydrogel, corresponding to water losses during curing.) The resulting mixture (solution) was left stirring for 1 hour with the magnetic bar. After that 1 hour, HQ and HMT as organic crosslinkers were each added at 0.3 wt % in the mixture and KCl was added at 2 wt % in the mixture, and the solution left stirring for 15 minutes. The KCl is not a crosslinker. The KCl was added to mimic the salinity of downhole conditions. Salts other than KCl, such as NaCl or $CaCl_2$, can be used to give the salinity in the Examples. The mixture was then flushed with nitrogen gas (the nitrogen gas purged/bubbled through the mixture) for about 30 seconds, and then the mixture as the in-situ synthesis solution placed in glass vials in an oven at 150° C. for 48 hours. The crosslinking was carried out at 150° C. and in presence of KCl to duplicate downhole conditions [relatively high temperature, high salinity (HT-HS)] in a wellbore in a subterranean formation. For comparison, neat-PAM hydrogel identically synthesized (but without nanofiller) was used as a reference. The thermal and rheological properties of the nanosand-PAM composite hydrogels in comparison to neat-PAM hydrogel were evaluated using TGA, DSC, and DMA.

Example 2

Nanosand-polymer composites (hydrogels) as nanosand-polymer core-shell structures were prepared. In particular, nanosand-PAM core-shell structures were formed via the in-situ method at varying concentrations of the nanosand. Natural sand of Saudi Arabia was obtained and ball milled to produce the nanosand.

PAM solutions in water were prepared. The PAM was low molecular weight PAM at 4 wt % in the water. Then, the solutions were well-mixed with nanosand at respective concentrations of the nanosand in the water in a range of 0.8 wt % to 4 wt % and the solutions subsequently cured at a curing temperature. Each of the PAM solutions were prepared in such a way that low molecular weight PAM (4 wt %) solution was added with the organic crosslinkers HQ and HMT (0.3 wt % each in the water) and KCl (2 wt % in the water) and stirred for 15 minutes. The resulting solution was then flushed with nitrogen gas for about 30 seconds and mixed with nanosand and placed in glass vials an oven at 150° C. as the curing temperature for 48 hours. Results are discussed below.

Below are results of analyses of nanofiller and nanofiller-polymer composites discussed above generally and in the aforementioned Examples 1 and 2. As indicated above, sand (macro sand) Examples 1 and 2 was natural sand obtained from Saudi Arabia. The sand was ball milled to produce nanosand (NS) to be used as nanofiller and that was characterized with x-ray diffraction (XRD) and scanning electron microscopy (SEM). For comparison, the sand was ball milled together with hexagonal boron nitride (hBN) to be used as nanofiller and also characterized. The nanofiller as a combination of NS and hBN is labeled as NSBN. The prepared NS and NSBN, respectively, were used to reinforce the PAM hydrogel. The prepared PAM composite hydrogels were characterized using TGA and DSC for thermal properties and using DMA for rheological properties, as discussed below.

Figure 3:
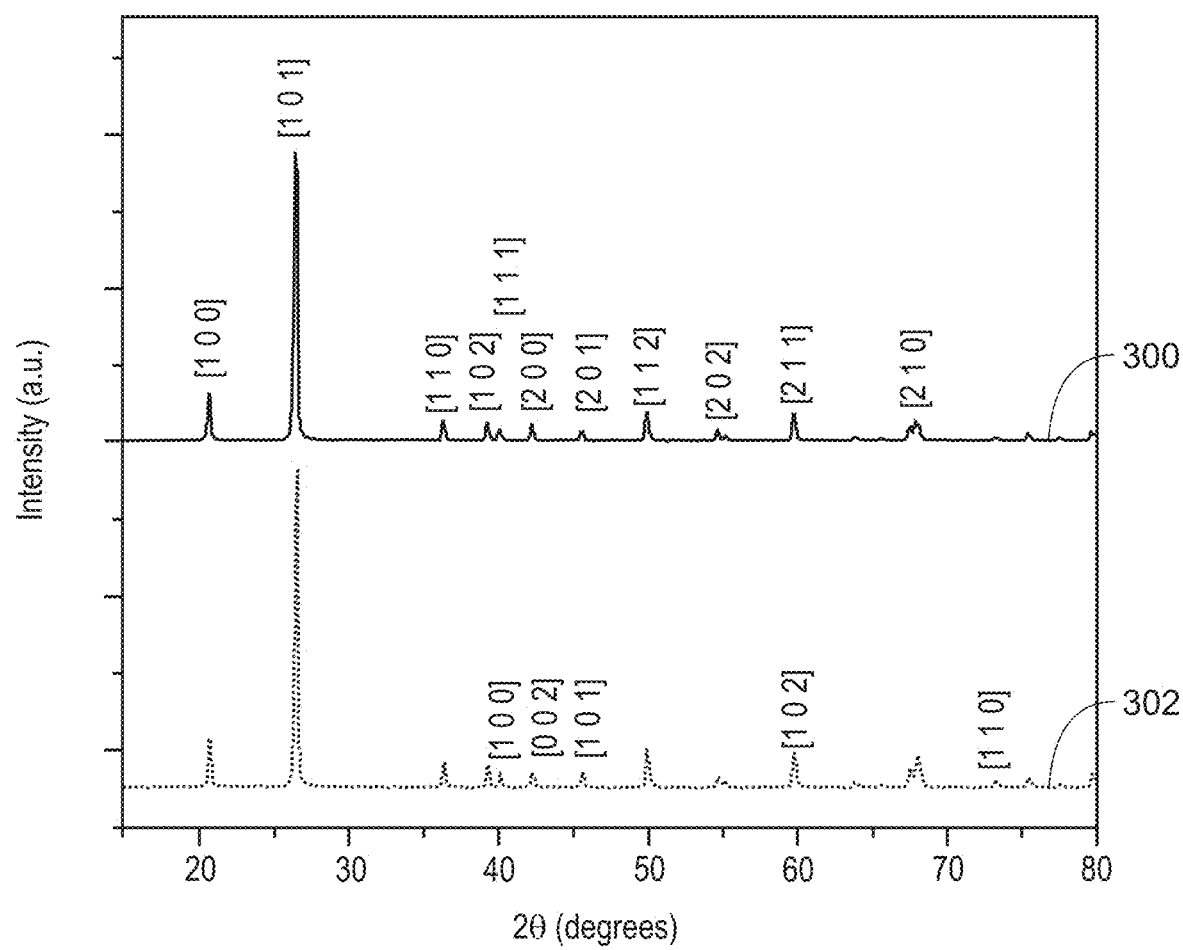
FIG. 3 is a plot of x-ray diffraction (XRD) patterns of nanofillers.

FIG. 3 is a plot of XRD patterns obtained for the nanofillers NS and NSBN. The intensity is in arbitrary units (a.u.). The scattering angle (or diffraction angle) is 2-theta in degrees. The patterns curve 300 is for NS. The patterns curve 302 is for NSBN. Both fillers depicted similar peaks at around 22°, 29°, 36°, 39°, 40°, 42°, 45°, 50°, 55°, 60° and 69° that match with quartz $SiO_2$. As for the NSBN, the hBN peaks were also detected at 40°, 42°, 46°, 60°, and 73°. Both nanofillers exhibited crystalline phase with particle size ranging from 40 nm to 55 nm. Again, the XRD patterns for the nanosand (NS) and nanosand/boron nitride (NSBN) nanofillers depicted peaks that resemble the behavior of quartz $SiO_2$ peaks. In addition, some detected peaks for NSBN match with hexagonal boron nitride. The three digit numbers in brackets are Miller indices (the diffracting planes).

Figure 4:
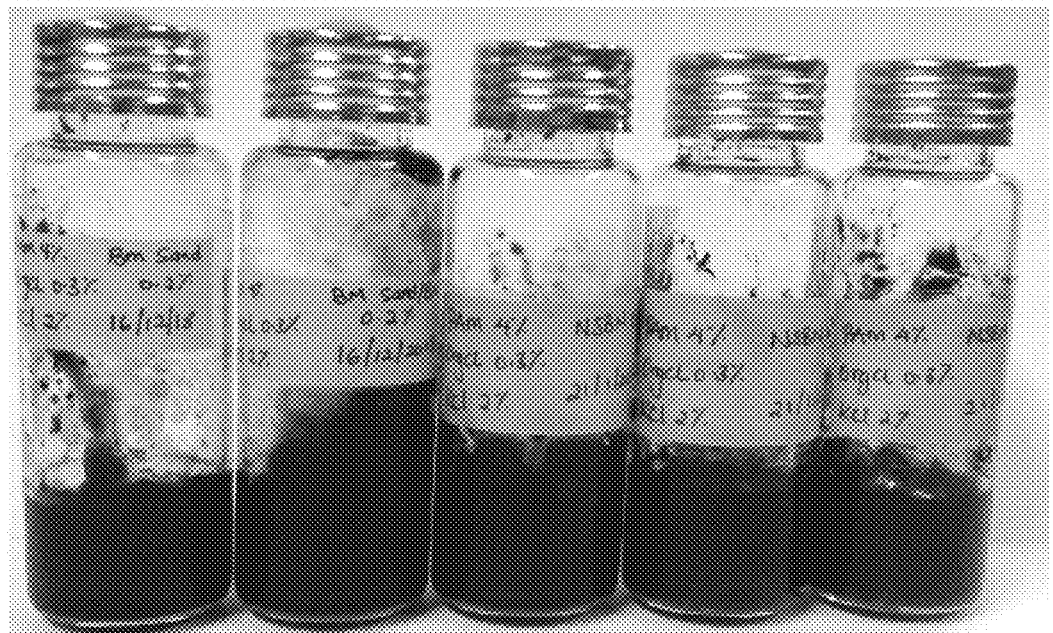
FIG. 4 is a photograph of nanosand-polyacrylamide composite hydrogels in vials.

FIG. 4 is a photograph of nanosand-PAM composite hydrogels in vials. From left to right, the weight ratio of the nanosand to PAM in the nanosand-PAM hydrogel is 0.2, 0.5, 0.8, 0.9, and 1.0.

Figure 5:
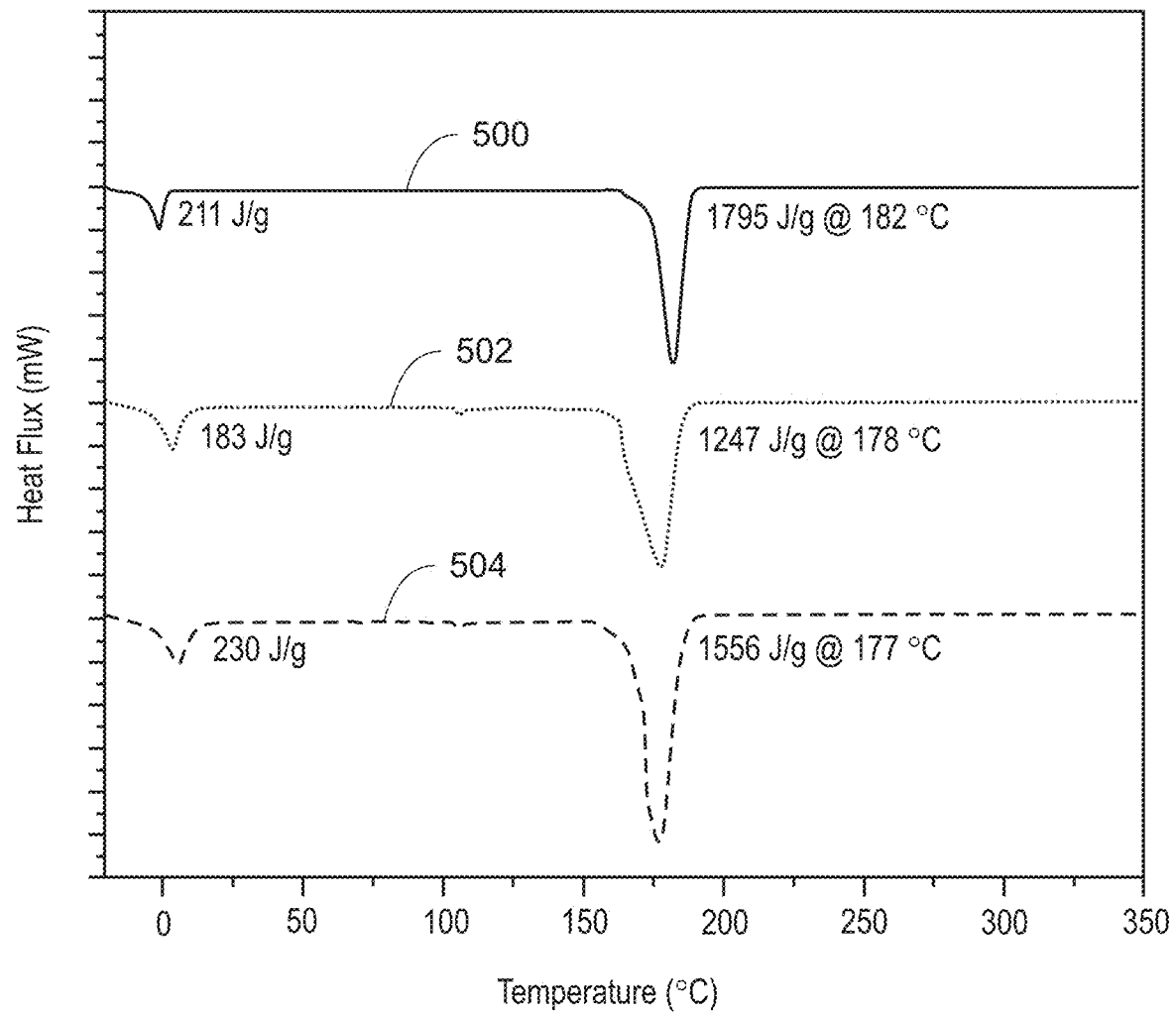
FIG. 5 is DSC thermograms of the three hydrogels formed in Example 1.

FIG. 5 gives DSC thermograms as heat flux in milliwatts (mW) over temperature (° C.) for the three PAM hydrogels formed in Example 1: neat PAM, PAM-NS, and PAM-NSBN. The DCS thermogram for neat PAM is provided for comparison. As presented above in Example 1, the three PAM hydrogels were formed with a synthesis solution that was primarily water. The synthesis solution included HQ, HMT, KCl, and 4 wt % PAM and was cured at 150° C. For the PAM-NS hydrogel, 0.2 wt % NS was included in the synthesis solution. For the PAM-NSBN hydrogel, 0.2 wt % NSBN at a weight ratio of NS to hBN of 1:1 was included in the synthesis solution.

The three DSC thermograms depicted are the thermogram 500 for neat-PAM hydrogel, the thermogram 502 for PAM hydrogel composite with NS, and the thermogram 504 for PAM hydrogel composite with NSBN. The PAM-NS hydrogel attained more bound water in comparison to the neat-PAM while the PAM-NSBN hydrogel had more free water within its network in comparison to the neat-PAM.

Referring to the DSC thermograms in FIG. 5, all three hydrogels depicted two peaks at around 0° C. and beyond 170° C. representing the water enthalpy and degradation enthalpy, respectively. From the first peak obtained, the amount of bound water and free water entrapped within the PAM matrix can be determined. The bound water is the water molecules that are directly attached to the surface of the PAM matrix through first degree hydrogen bonding while the free water is the water molecules attached to another water molecule with secondary hydrogen bond. In other words, bound water forms stronger interaction with the PAM matrix than the free water. This may also mean that the interactives sites (hydrophilic group) of the PAM matrix can be limited for the direct interaction with the NS filler.

In reference to FIG. 5, the PAM-NS composite hydrogel attained higher bound water (about 45%) compared to PAM-NSBN (about 31% bound water) and neat-PAM (about 37% bound water). Also, the degradation enthalpy that is the energy required to break the newly formed bond between the PAM and NS was seen to reduce compared to the neat-PAM. This is due to the more water molecules being attached to the PAM matrix. In addition, the degradation temperature of the PAM composite hydrogels was lower than the neat-PAM hydrogel despite the neat-PAM hydrogel attaining beyond 150° C. degradation temperature. Such may indicate that the fillers (NS and NSBN) can have a lubricating effect on the PAM matrix, causing the PAM chain to slip readily easily at slightly lower temperatures.

Figure 6:
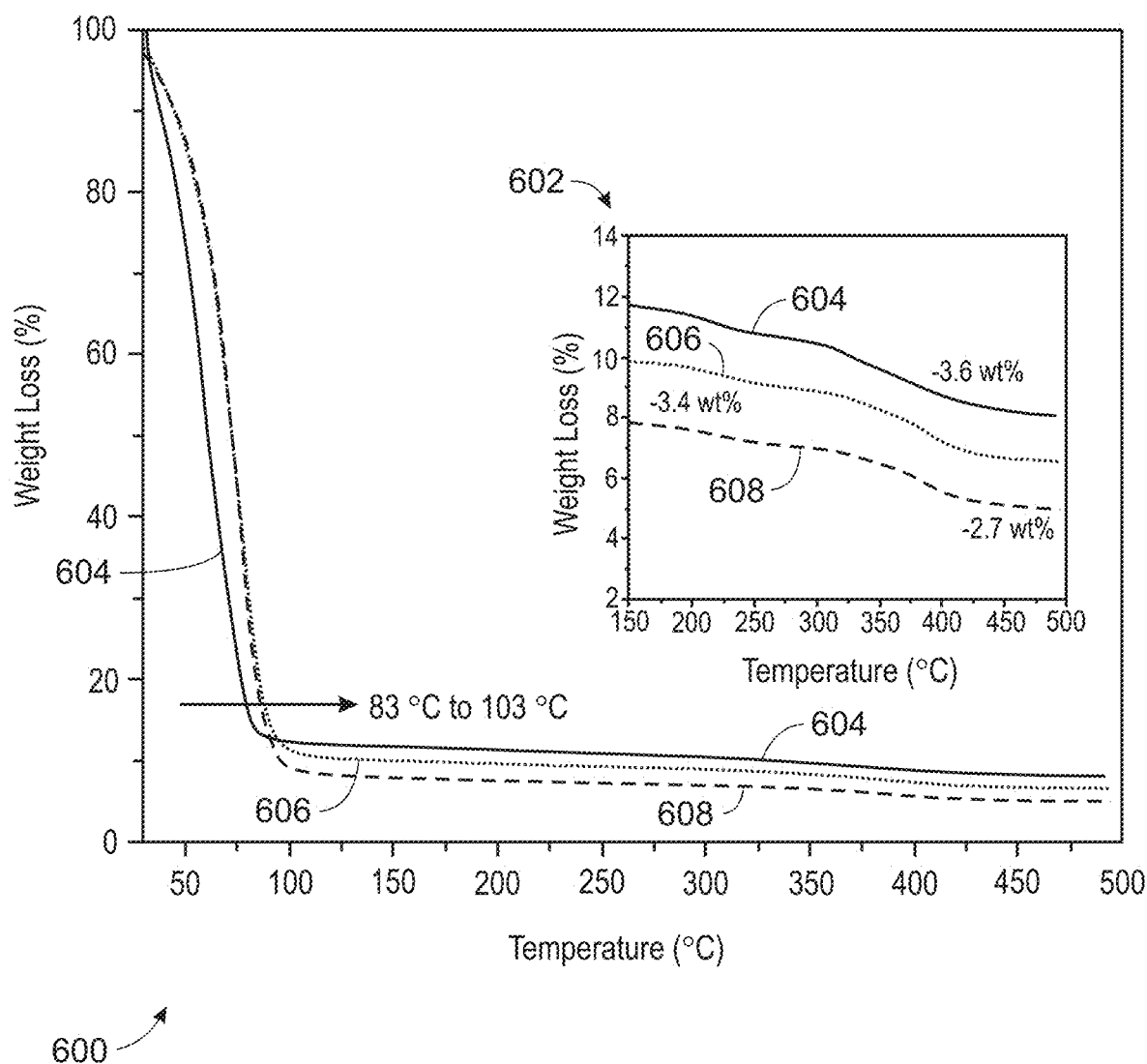
FIG. 6 is a plot of TGA thermograms of the hydrogels formed in Example 1.

FIG. 6 is a plot 600 of three TGA thermograms in weight loss (%) over temperature (° C.) for three respective PAM hydrogels formed in Example 1: neat PAM, PAM-NS, and PAM-NSBN. An inset plot 602 is given to show a more expanded view of the TGA thermograms beyond 150° C., which is after most of the water has evaporated. As discussed, the PAM-NS is a nanosand-reinforced PAM composite hydrogel. The PAM-NSBN is a nanosand/hBN reinforced PAM composite hydrogel. The TGA thermogram for neat PAM is provided for comparison.

The TGA thermogram 604 is for the neat-PAM hydrogel with PAM at 4 wt %. The TGA thermogram 606 is for the PAM-NS with PAM at 4 wt % and NS at 0.2 wt %. The TGA thermogram 608 is for the PAM-NSBN with PAM at 4 wt % and NSBN at 0.2 wt %, and the weight ratio of NS to BN is 1:1.

The PAM composite hydrogels displayed more thermal stability compared to neat-PAM hydrogel. This increased thermal stability is indicated by: (1) the shift in temperature depicted in plot 600 for a given weight loss for the PAM composite hydrogels compared to the neat-PAM hydrogel; and (2) the lower weight loss beyond 150° C. depicted in the inset plot 602 for the dried PAM composite hydrogels compared to the dried neat-PAM hydrogel.

As mentioned, FIG. 6 shows TGA thermograms of the PAM composite hydrogels in comparison to the TGA thermogram of the neat-PAM hydrogel. The significant weight loss was recorded at around 103° C. for the PAM composite hydrogels and at about around 83° C. for the neat-PAM hydrogel. The weight loss may generally be due to the evaporation of water. In this respect, the PAM composite hydrogels showed more stability compared to the neat-PAM hydrogel. This is evident by the shift in the water evaporation temperature recorded for water evaporation (from about 83° C. to 103° C., or more generally from about 80° C. to about 110° C.) As for the hydrogels as dried beyond 150° C., the hydrogel in presence of NS or NSBN lost less weight (3.4% and 2.7%, respectively) compared to 3.6% weight loss of the neat-PAM. Even though the difference is relatively small, this improvement took place with addition of only 0.2 wt % nanofiller reinforcement for the PAM matrix.

Figure 7:
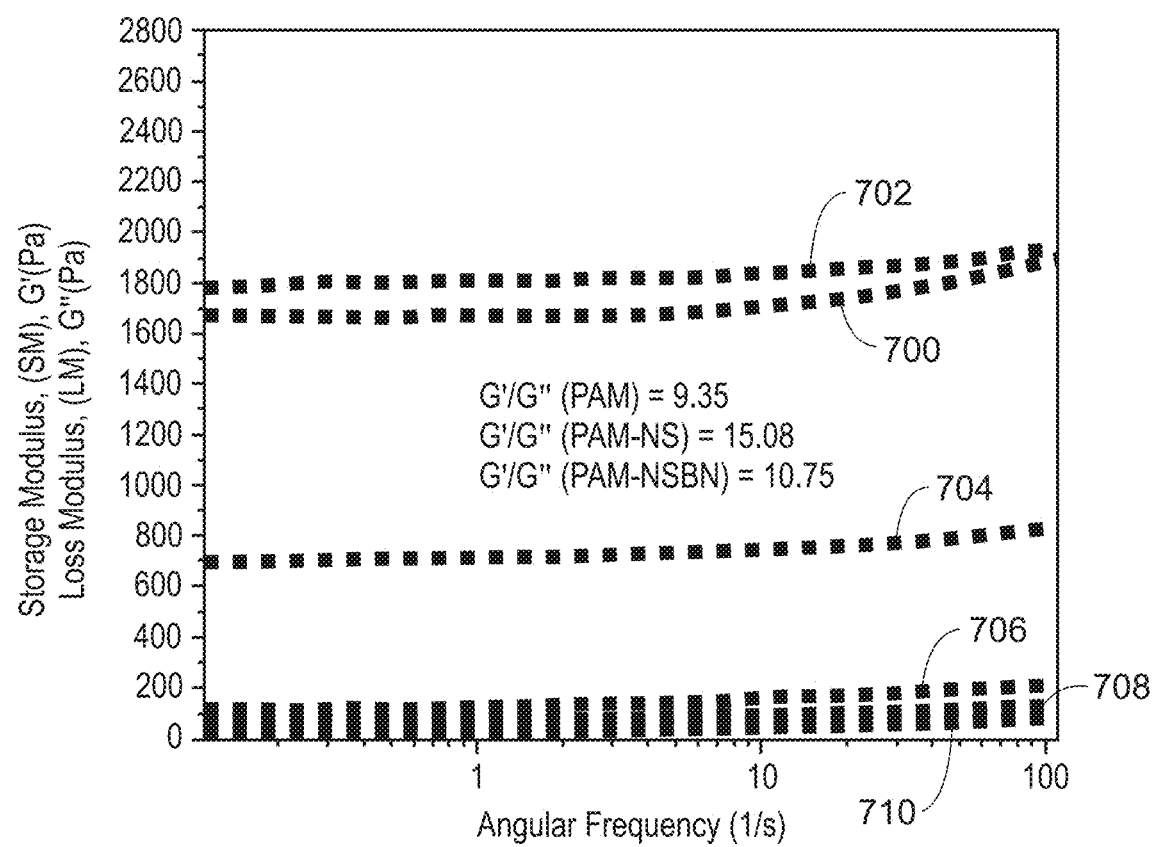
FIG. 7 is a plot of results of DMA analysis of the three hydrogels formed in Example 1.

FIG. 7 is a plot of results of DMA analysis of the three hydrogels formed in Example 1. The plot gives storage modulus G' and loss modulus G", both in units of Pascal (Pa), versus the angular frequency in reciprocal seconds. Storage modulus G' may be viewed as the elastic modulus. Loss modulus G" may be views as the viscous modulus. The three hydrogels are: neat-PAM (PAM 4 wt %), PAM-NS (PAM 4 wt %, NS 0.2 wt %), and PAM-NSBN (PAM 4 wt %, NSBN 0.2 wt %, the NS:hBN=1:1 based on weight). As discussed, the PAM-NS is nanosand-reinforced PAM composite hydrogel. The PAM-NSBN is nanosand/hBN reinforced PAM composite hydrogel. Neat PAM hydrogel was analyzed for comparison. Six curves of data points are plotted. The curve 700 is G' for the neat-PAM hydrogel. The curve 702 is G' for the PAM-NS. The curve 704 is G' for the PAM-NSBN. The curve 706 is G" for the neat-PAM hydrogel. The curve 708 is G" for the PAM-NS. The curve 710 is G" for the PAM-NSBN.

The results indicate that the PAM composite hydrogels are more solid-like in having higher gel strength (G'/G") compared to the neat-PAM hydrogel. Also, the PAM-NS hydrogel exhibited better rheological properties with higher storage modulus (G', elasticity). The G' was higher than G" for all the hydrogels, implying the hydrogels behave more solid-like. Consequently, reinforcing the PAM matrix with NS or NSBN enhanced the gel strength compared to the neat-PAM hydrogel as indicated from the G'/G" calculated. The ratio G'/G" for the neat PAM hydrogel was about 9.35. The ratio G'/G" for the PAM-NS composite hydrogel was about 15.08. The ratio G'/G" for the PAM-NSBN composite hydrogel was about 10.75.

Figure 8:
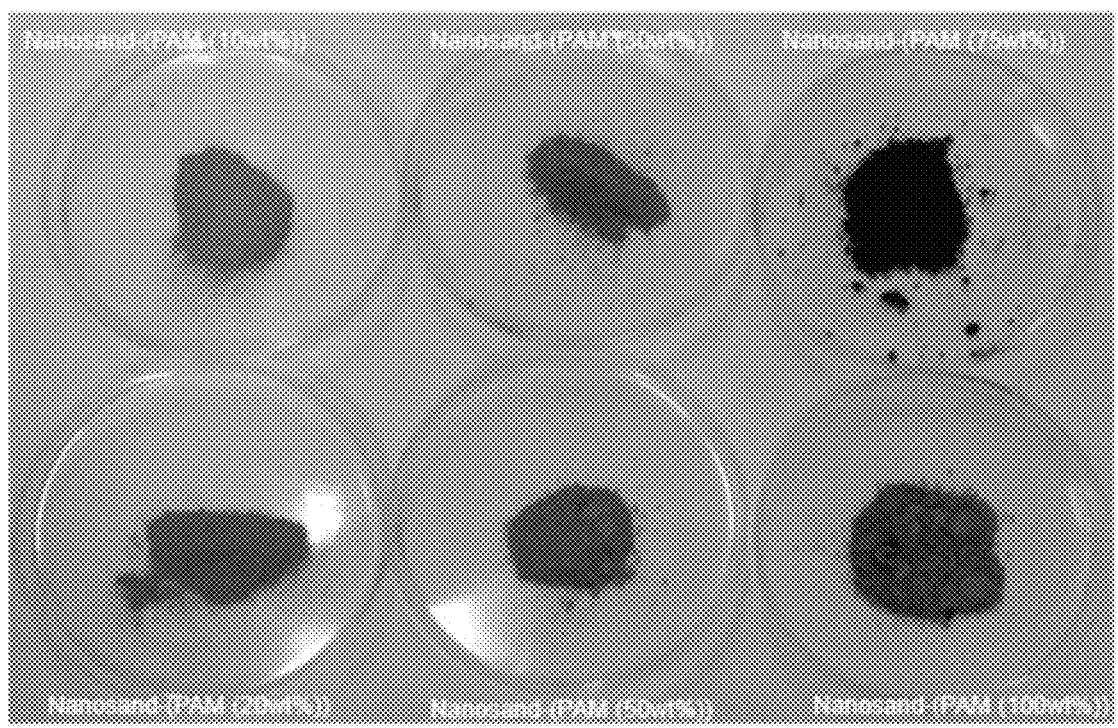
FIG. 8 is photographs of dried samples of nanosand-polyacrylamide core-shell structures formed in Example 2.

FIG. 8 is photographs of dried samples of nanosand-PAM core-shell structures formed in Example 2. The samples are nanosand and PAM without liquid or significant liquid. Each sample has a different weight ratio of PAM to nanosand, as indicated. For instance, the depicted 100 wt % means for the nanosand-PAM core-shell structures in that sample, the weight ratio of PAM to nanosand is 1. The depicted 10 wt % means for the nanosand-PAM core-shell structures in that sample, the weight ratio of PAM to nanosand is 0.1. The color of the samples gradually changed as a function of the increasing PAM. The 10 wt % sample was an orange sandy color. The 50 wt % sample was a brown color. The 100 wt % was a dark grey color. The change in color for the samples over increasing PAM concentration indicates successful coating of PAM shell to the nanosand in the preparation of the core-shell nanostructures at the increased PAM concentrations.

Figure 9:
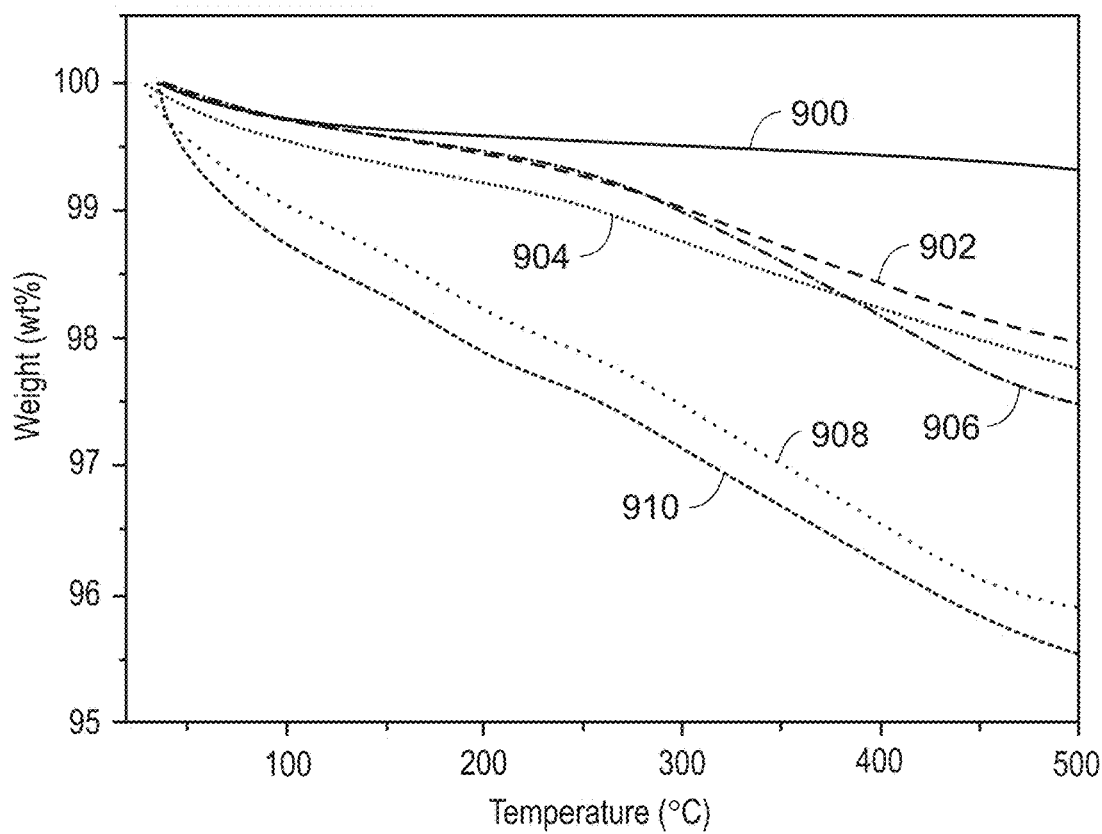
FIG. 9 is a plot of TGA thermograms of the nanosand-polyacrylamide core-shell structures of varied weight ratios of polyacrylamide to nanosand prepared in Example 2.

FIG. 9 is a plot of TGA thermograms of nanosand-PAM core-shell structures of varied weight ratios of PAM to nanosand prepared in Example 2. The y-axis is weight percent of the sample with 100 wt % being the sample prior to any weight loss. The x-axis is temperature (° C.).

All of the TGA thermograms depicted are for NS-PAM core-shell structures. The TGA thermogram 900 is for a weight ratio of PAM to NS equal to about 0.1. The TGA thermogram 902 is for a weight ratio of PAM to NS equal to about 0.2. The TGA thermogram 904 is for a weight ratio of PAM to NS equal to about 0.3. The TGA thermogram 906 is for a weight ratio of PAM to NS equal to about 0.5. The TGA thermogram 908 is for a weight ratio of PAM to NS equal to about 0.75. The TGA thermogram 910 is for a weight ratio of PAM to NS equal to about 1.

The TGA thermograms in FIG. 9 demonstrate that a great amount of PAM coating means a greater resistance to temperature degradation of the core-shell nanostructures. Such indicates successful coating of PAM shell to the nanosand at greater amount of PAM in the preparation of the core-shell nanostructures.

Embodiments include in-situ methods of preparing polymer composites with nanosand. The nanosand is prepared by ball milling sand (e.g., natural sand from Kingdom of Saudi Arabia). The nanosand is utilized as nanofiller for a polymer matrix or as core for a polymer shell. In implementations, the polymer included PAM. The nanosand was also prepared in presence of hBN, which gave comparisons to nanosand only. The nanofiller (e.g., nanosand only or a combination of nanosand and hBN) in the polymer composites may be at a concentration, for example, in a range of 0.1 wt % to 1 wt %. For implementations with hBN utilized, the weight ratio of hBN to nanosand may be, for example, in a range of 0.1 to 1. The PAM-nanosand composite hydrogels were prepared through in-situ method. In examples, the concentration of the PAM was maintained at 4 wt % while the concentration of the organic crosslinker was 0.3 wt % in presence of 2 wt % KCl, and the mixtures were then cured at 150° C. for 48 hours to produce the PAM-nanosand composite hydrogel that is suitable for a high temperature reservoir. The polymer-nanosand composites were optimized or enhanced based on their thermal stability and rheological properties. The thermal and mechanical properties of the prepared hydrogels were studied using DSC, TGA, and DMA. The enhancement in the thermal and mechanical properties of the nanosand reinforced polymer composites was found to be higher than that of neat polymer counterparts. The techniques included the preparation of nanosand-polymer core shell structures. Again, nanosand is prepared by ball milling sand for several hours. The prepared nanosand is mixed with PAM solution or monomer and crosslinker (e.g., crosslinker mixture) and cured or polymerized under high temperatures to obtain the core-shell structures wherein the nanosand is the core and the polymer is the shell. For the core-shell structures, the weight ratio of polymer to nanosand may be in the range of 0.1 to 1.

Figure 10:
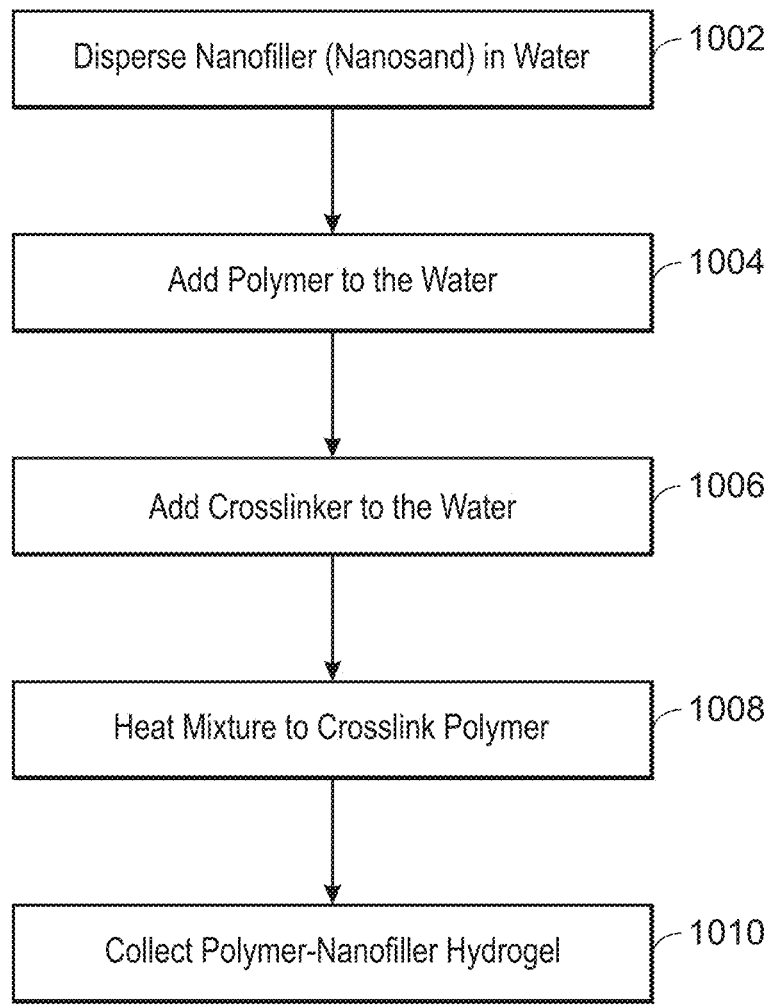
FIG. 10 is a block flow diagram of a method of forming a polymer-nanofiller hydrogel.

FIG. 10 is a method 1000 of forming a polymer-nanofiller hydrogel. At block 1002, the method includes dispersing the nanofiller in water, such as in a vessel. The nanofiller includes at least nanosand. The nanofiller may additionally include, for example, hBN. The dispersing of the nanofiller in the water may involve sonicating the water and nanofiller. The dispersing of the nanofiller in the water may involve mixing the nanofiller and water in the vessel via a mechanical mixer, such as via a rotating mixer or agitator.

For implementations with hBN included in addition to the nanosand, the hBN may be, for example, in the range of 1 wt % to 10 wt % of the nanofiller, and the nanosand may be, for example, in the range 90 wt % to 99 wt % of the nanofiller. In certain implementations, the nanofiller may have a composition in a range of 99 wt % nanosand/1 wt % hBN to 90 wt % nanosand/10 wt % hBN.

At block 1004, the method includes adding polymer to the water. The polymer may added at the concentrations in the water discussed above. The polymer may be, for example, PAM or PS-PMMA (PS-PMMA/DVB). The adding of the polymer to the water may involve mixing the polymer with the water or solution.

At block 1006, the method includes adding a crosslinker to the water. In some implementations, the crosslinker includes HQ or HMT, or both. The crosslinker may added at the concentrations in the water discussed above. The adding of the crosslinker to the water may involve mixing the crosslinker with the water or solution.

A mixture is formed including at least the polymer, the crosslinker, the nanofiller, and the water. The method may include flushing the mixture (purging through the mixture) with nitrogen, such as at least for about 30 seconds. A purpose of flushing the mixture may be to remove the dissolved oxygen in the water and make the water more inert (e.g., to mimic the downhole condition). The method may include adding KCl to the water (e.g., at 0.2 wt % in the water) and thus the mixture would include the KCl.

At block 1008, the method includes heating the mixture to crosslink the polymer to give crosslinked polymer. The heating and crosslinking of the polymer may be characterized as curing. The mixture may be heated to temperatures (curing temperatures) discussed above. The method may include mixing the mixture while or during (contemporaneous with) heating the mixture. The polymer-nanofiller hydrogel formed includes the nanofiller and polymer hydrogel. The polymer hydrogel includes the crosslinked polymer and the water. The crosslinked polymer may include crosslinked PAM, and thus the polymer hydrogel may be PAM hydrogel. The crosslinked polymer may include crosslinked PS-PMMA, and thus the polymer hydrogel may be PS-PMMA hydrogel.

In implementations, the crosslinked polymer is reinforced with the nanofiller. In implementations, the polymer-nanofiller hydrogel is a core-shell structure with the polymer hydrogel as shell and the nanofiller as core.

The crosslinked polymer and the nanofiller may form a composite of the crosslinked polymer and the nanofiller. The composite can include the crosslinked polymer reinforced with the nanofiller. The composite can be a core-shell structure having a core and a shell, wherein the core includes the nanofiller and the shell includes the crosslinked polymer.

At block 1010, the method includes collecting the polymer-nanofiller hydrogel, such as for application in treating a wellbore in a subterranean formation. The polymer-nanofiller hydrogel may be pumped or injected into the wellbore, or otherwise applied in the wellbore. The treatments may address excess water production or loss circulation by employing the nanosand-polymer composites to plug formation permeability. The treatments in the wellbore and subterranean formation may be drilling or hydraulic fracturing, and with the polymer-nanofiller hydrogel incorporated into drilling fluid or fracturing fluid.

Embodiments incorporate the grinding or milling (e.g., ball milling) of natural sand to give nanosand as nanofiller (and/or crosslinker) for the polymer-nanofiller hydrogel. Incorporation of nanosand in a polymer-nanofiller hydrogel may give more thermally stable hydrogels and polymer composites with increased gel strength. Properties of the prepared polymer composites may be improved by reinforcing the polymer with nanosand. In implementations, the following enhancements were observed: (1) increased thermal stability with higher degradation temperature above 175° C.; (2) increased water entrapment within the hydrogel network while maintaining hydrogel thermal stability (as indicated from the shift in the temperature at which the water evaporated, e.g., 20° C. increase); and increased gel strength (G'/G") with incorporation of nanosand at merely 0.2 wt %. Embodiments providing nanosand-reinforced PAM hydrogel (e.g., nanosand obtained from milling natural sand from Saudi Arabia) can give thermal stability and gel strength comparable other PAM-reinforced hydrogels and at lower cost. The present polymer-nanofiller hydrogel (polymer-nanosand hydrogel) may be attractive for water shutoff application, including in mature oil fields with excessive water production, even at high temperature (e.g., 150° C.). The polymer-nanosand hydrogel may be utilized for subterranean formation-flow sealing for water shut-off, including to shut-off excess water production from high permeability zones. In addition to addressing excess water production, the polymer-nanosand hydrogel may be employed to address fracturing fluid limitations, enhance drilling fluid properties, address loss circulation, and so on.

Figure 11:
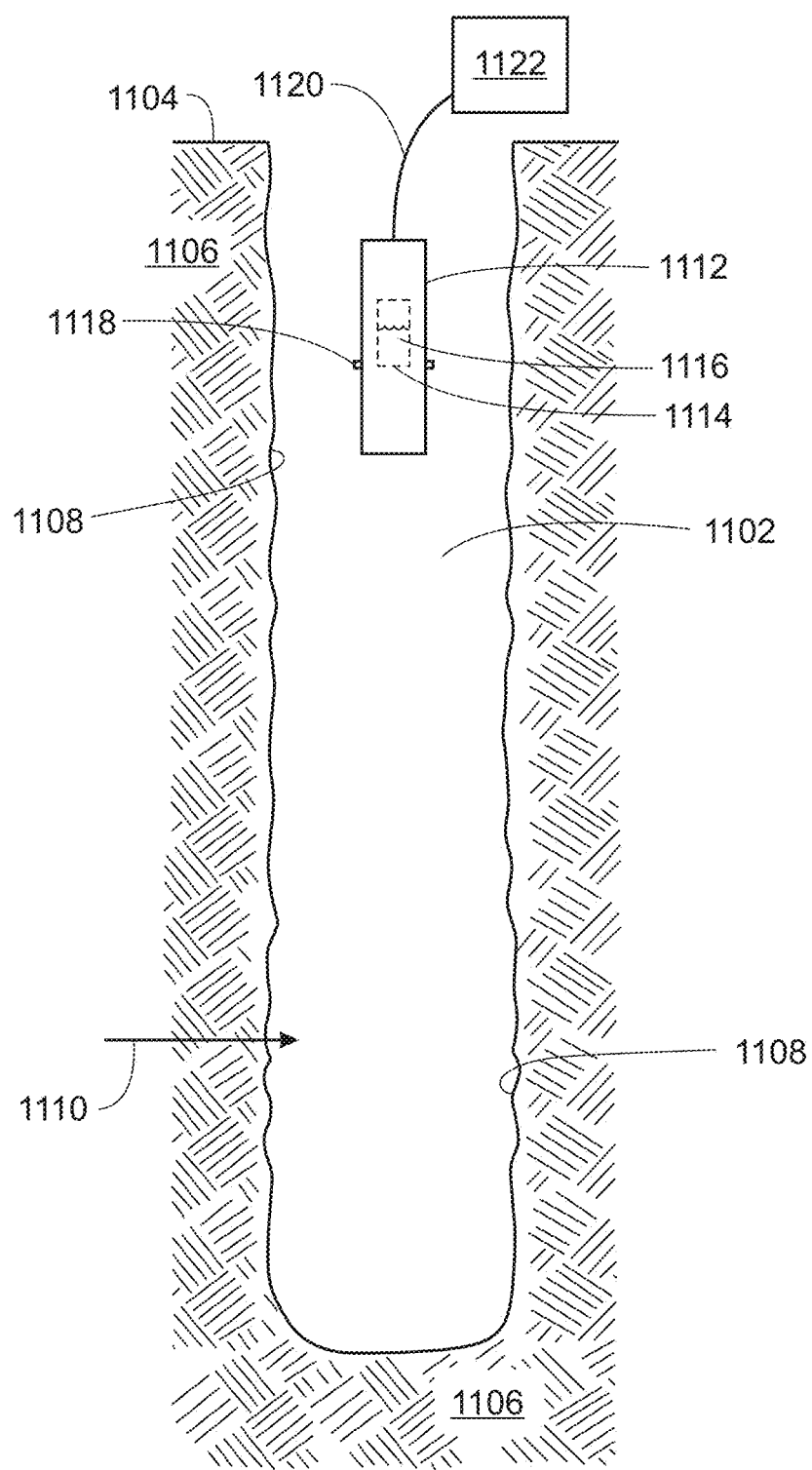
FIG. 11 is a well site having a wellbore through the Earth surface into a subterranean formation in the Earth crust.

FIG. 11 is a well site 1100 having a wellbore 1102 through the Earth surface 1104 into a subterranean formation 1106 in the Earth crust. The subterranean formation 1106 may also be labeled as a geological formation, hydrocarbon formation, hydrocarbon reservoir, etc. Hydrocarbon is produced from the subterranean formation 1106 through the wellbore 1102 to the surface 1104. The hydrocarbon may be crude oil or natural gas, or both. To form the wellbore 1102, a hole is drilled into the subterranean formation 1106 to generate a formation surface 1108 as an interface for the wellbore 1102 with the subterranean formation 1106. The formation surface 1108 can be characterized as a wall of the wellbore 1102. The wellbore 1102 may be openhole or have a casing (not shown).

The illustrated wellbore 1102 has a water zone to be isolated. A water zone is an example of a problematic section in a wellbore 1102. The wellbore 1102 wall in the water zone may be the subterranean formation 1106 interface (formation surface 1108) defining that portion of the wellbore. Water 1110 may enter at a water zone into the production fluid. The water zone may include a permeable or fractured interface of the formation surface 1108 of the wellbore 1102.

This problematic zone can be a water-producing zone within a hydrocarbon-producing zone. At the water zone, water 1110 enters the wellbore 1102 from the subterranean formation 1106. The water zone may be isolated to restrict introduction of the water 1110 into the wellbore 1102. The water zone may be isolated to prevent receipt of the water 1110 into the fluid flowing through the wellbore 1102. For example, the isolation may inhibit flow of the water 1110 into the produced hydrocarbon flowing through the wellbore 1102 to the Earth surface 1104. The isolation of the water zone may involve chemical treatment. The chemical treatment may damage the formation 1106 to plug or reduce porosity by plugging the pores at the formation surface 1108 in the water zone. The chemical treatment may be a polymer treatment or cement treatment.

In the illustrated embodiment, an application device 1112 applies the polymer-nanofiller hydrogel (e.g., polymer-nanosand hydrogel) disclosed herein as water-shutoff chemical treatment to the water zone. Application of the polymer-nanofiller hydrogel plugs the formation 1106 at the water zone to isolate the water zone. The application device 1112 may include a chamber 1114 (inner cavity) containing polymer-nanofiller hydrogel 1116 to be applied. The application device 1112 may have a nozzle or nipple 1118 to inject the hydrogel 1116 from the chamber 1114. In one implementation, the application device 1112 has a piston to push the hydrogel 1116 from the chamber 1114 through the nozzle or nipple 1118. The application device 1112 may have multiple nozzles or nipples 1118. In some implementations, the application device 1112 is a straddle packer having the chamber 1114 and the nipple 1118. The hydrogel 1116 injected from the application device 1112 (discharged or ejected through the nipple 1118) may contact the formation surface 1108 at the water zone to plug or foul the formation 1106 at the water zone.

To deploy the application device 1112, a deployment extension 1120 from a dispenser 1122 may lower the application device 1112 into the wellbore 1102. For application devices 1112 that are temporary or retrievable, the deployment extension 1120 may retrieve (raise, pull, remove) the application device 1112 from the wellbore 1102. In some implementations, the deployment extension 1120 is coiled tubing and the dispenser 1122 is a coiled tubing reel. In other implementations, the deployment extension 1120 is a wireline and the dispenser 1122 is a wireline truck. The deployment extension 1120 may be a conduit, cable, slickline, work string, drill string, or jointed pipe. The application device 1112 may be lowered to the water zone and then activated. When activated, the application device 1112 anchors (e.g., via mechanical slips) and discharges (ejects) the hydrogel from the chamber through application-packer nozzle(s) 1118.

The application device 1112 may be a straddle packer or modified straddle packer. A straddle packer may be modified to incorporate features (for example, the hydrogel chamber 1114 and nozzles 1118) of the application device 1112 if needed or applicable. Straddle packers (whether hydraulic or electric) may provide for isolation of a wellbore zone. Straddle packers and bridge plugs may provide zonal isolation in a wellbore. Present embodiments include a straddle packer having a chamber or inner cavity that carries the polymer-nanofiller hydrogel. When the straddle packer is activated, the straddle packer may anchor (mechanically set) against the formation surface 1108 and eject the hydrogel to facilitate isolation of the zone of interest. Again, the application device 1112 may be a straddle packer having a chamber 1114 to carry the polymer-nanofiller hydrogel 1116 to isolate the water zone. The straddle packer having polymer hydrogel in a chamber may deploy (form) a polymer hydrogel sealing at the water zone. When activated, the straddle packer anchors (mechanically sets) above and below the waters, and discharges (ejects) the hydrogel from the chamber through straddle-packer nipple(s) into the subterranean formation 1106 at the water zone to plug or seal features of the subterranean formation 1106 in the water zone.

Figure 12:
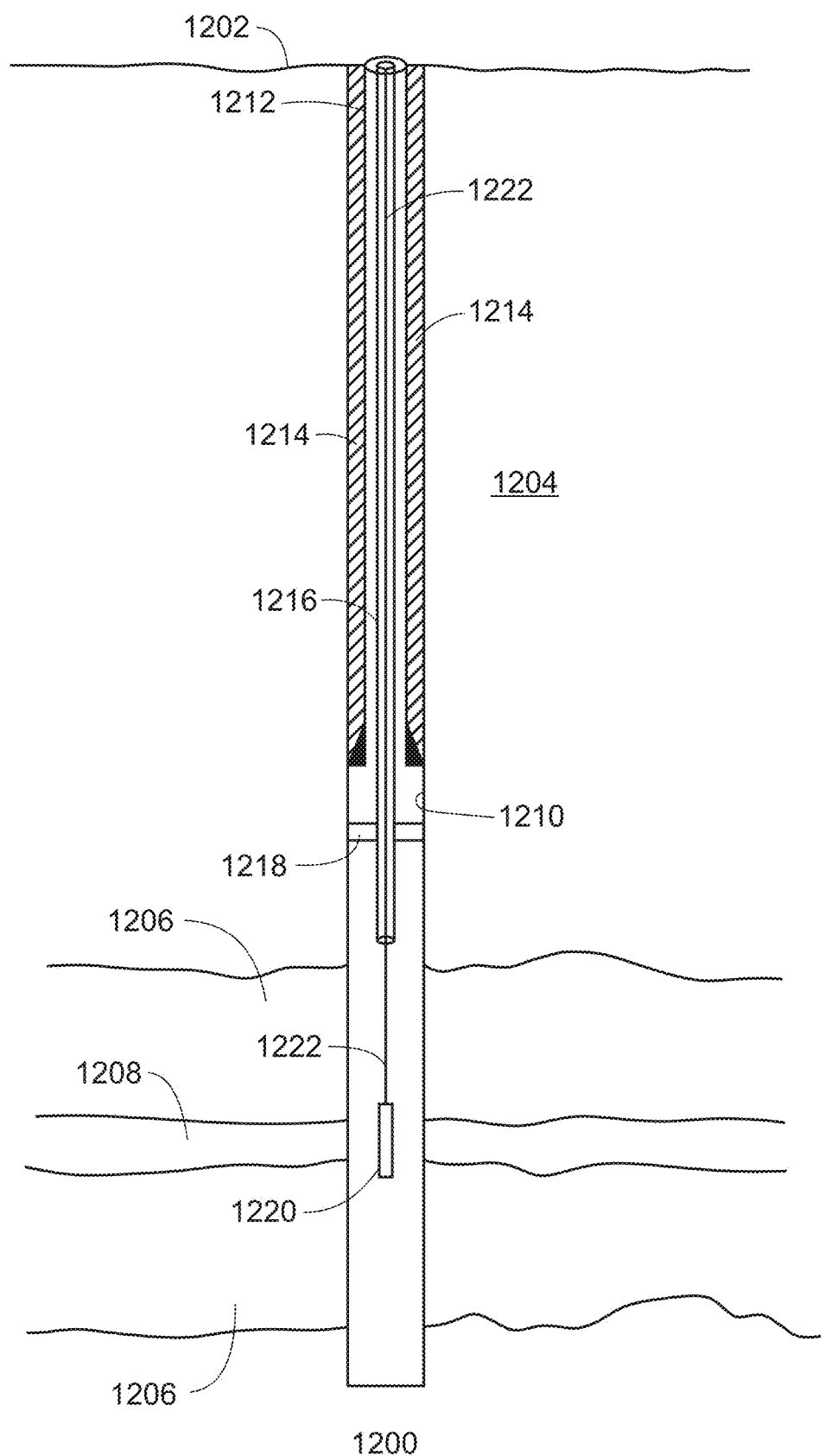
FIG. 12 is a well site having a wellbore through the Earth surface into a subterranean formation in the Earth crust.

FIG. 12 is a wellbore 1200 formed through the Earth surface 1202 into a subterranean formation 1204. The subterranean formation 1204 includes hydrocarbon reservoir formations 1206 and an intervening water producing zone 1208. Water may enter the wellbore 1200 from the water producing zone 1208. That portion of the wellbore 1200 may be labeled as a water zone. Produced water may refer to subterranean formation water that is co-produced with the crude oil or natural gas. The produced water can cause production problems by generating emulsions, scale, and corrosion. The production of water may incur operational cost because the produced water must typically be separated from the hydrocarbons.

An inner surface of the wellbore 1200 is the formation surface 1210 of the subterranean formation 1204. In the illustrated embodiment, a portion of the wellbore 1200 has a casing 1212 with cement 1214 disposed between the casing 1212 and the formation surface 1210. The wellbore 1200 has a production tubing 1216 (through a production packer 1218) for the flow of produced fluid including hydrocarbon to the surface 1202. The hydrocarbon may be crude oil or natural gas that enters the wellbore 1200 from the hydrocarbon reservoir formations 1206.

The produced fluid flowing upward through the production tubing 1216 also includes water that enters the wellbore 1200 from the water producing zone 1208. It may be desired to isolate the water zone in the wellbore 1200 to prevent water from water producing zone 1208 entering the wellbore 1200 and becoming a component of the production fluid. The isolation of the water zone may be mechanical or chemical (or a combination of mechanical and chemical). The chemical treatment for water shut-off maybe by an application device 1220 that is the same or analogous to the application device 1110 of FIG. 11. In implementations, the application device 1220 may be a straddle packer.

The application device 1220 may be deployed via a deployment extension 1222 to the water zone in the wellbore (at the water producing zone 1208). In some embodiments, the deployment of the application device 1220 into the wellbore 1200 may be rigless. A rigless operation may be a well intervention conducted with equipment and support facilities that preclude the requirement for a rig over the wellbore 1200. The deployment extension 1222 may be coiled tubing, wireline, or slickline for rigless deployment. The application device 1220 or straddle packer may mechanically set at or around the water zone and eject polymer-nanofiller hydrogel (e.g., polymer-nanosand hydrogel) into the formation 1204 (at the water producing zone 1208) to seal the formation 1204 at the water zone. Such may restrict or reduce introduction of water from the water producing zone 1208 into the wellbore 1200.

Figure 13:
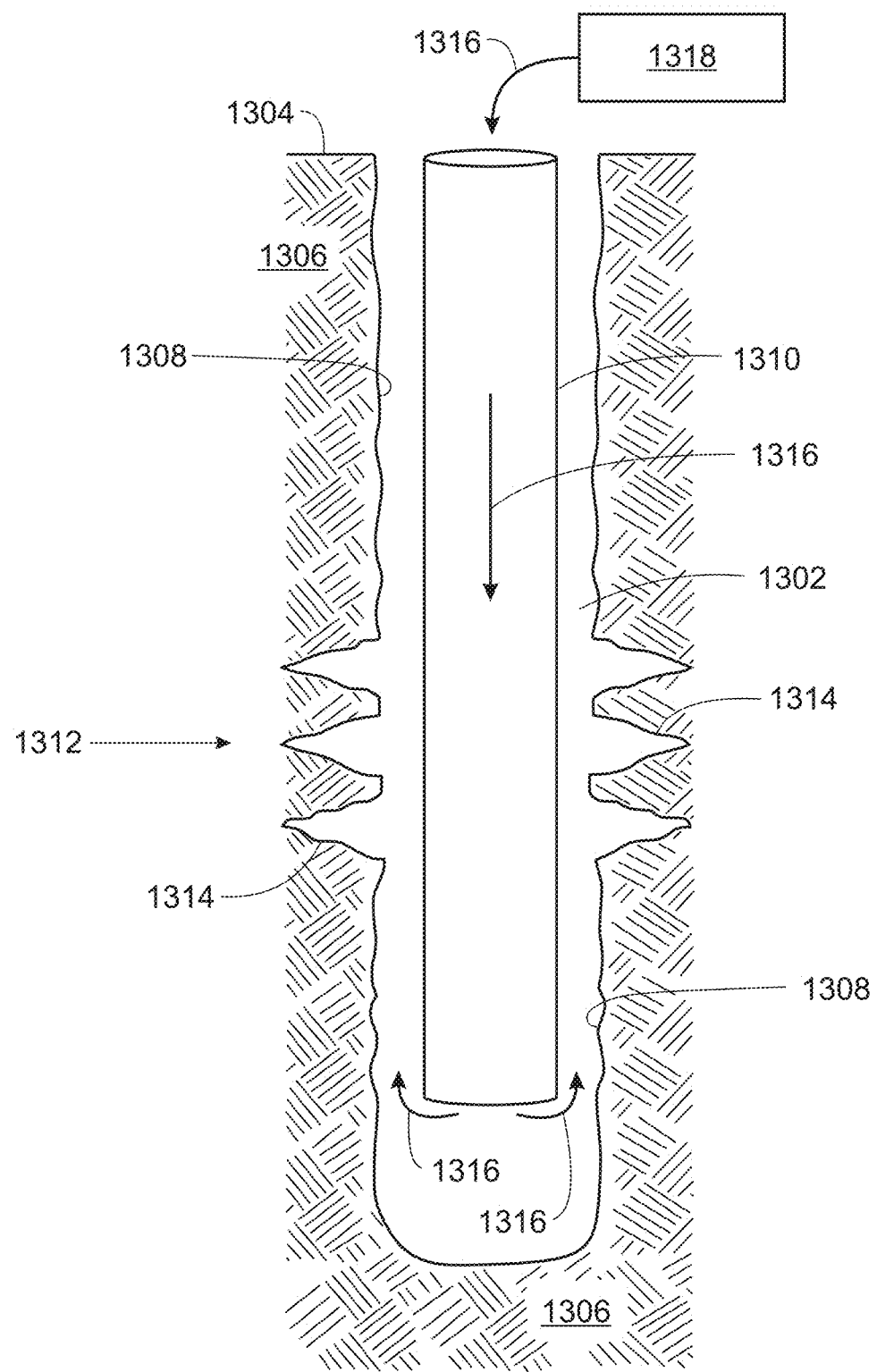
FIG. 13 is a well site having a wellbore through the Earth surface into a subterranean formation in the Earth crust.

FIG. 13 is a well site 1300 having a wellbore 1302 through the Earth surface 1304 into a subterranean formation 1306 in the Earth crust. The subterranean 1306 may also be labeled as a geological formation, hydrocarbon formation, reservoir, etc. Hydrocarbon may be produced from the subterranean formation 1306 through the wellbore 1302 to the surface 1304. The hydrocarbon may be crude oil or natural gas, or both. To form the wellbore 1302, a hole (borehole) is drilled into the subterranean formation 1306 to generate a drilled formation surface 1308 as an interface for the wellbore 1302 with the subterranean formation 1306. The formation surface 1308 may be characterized as the wellbore 102 wall. The wellbore 1302 may have openhole portions but generally includes a cylindrical casing 1310 as shown. The wellbore 1302 in the depicted implementation of FIG. 13 is a cased wellbore 1302. In the illustrated embodiment, the wellbore 1302 has a zone 1312 to be treated.

In implementations, the zone 1312 may be a water zone in which water is introduced into the wellbore 1302 from the subterranean formation 1308. The water may be introduced through features 1314 (e.g., fractures, permeable channels, high permeability portions, etc.) that contribute to introduction of excess water from the subterranean formation into the wellbore 1302.

A treatment fluid 1316 as or having the polymer-nanofiller hydrogel (e.g., polymer-nanosand hydrogel) discussed herein may be introduced (e.g., pumped) into the wellbore 1302. The treatment fluid 1316 may be a water-shutoff chemical that flows through the casing 1310, discharges from the bottom portion of the casing 1310, and flows upward through the annulus between the casing 1310 and the formation surface 1308. The treatment fluid 1316 may invade the features 1314 to plug or seal the features 1314 to stop or reduce water flow from the subterranean formation 1306 through the features 1314 into the wellbore 1302.

The treatment fluid 1316 may be pumped by a surface pump (e.g., mud pump) of the surface equipment 1318 at the surface 1304. In certain implementations, the pump may be associated with a drilling rig. The pump(s) can be skid-mounted in some instances. The pump may be a centrifugal pump, positive displacement (PD) pump, reciprocating PD pump such as a piston or plunger pump, and so on. The surface equipment 1318 may include equipment (e.g., vessels, solid-handling equipment, piping, pumps etc.) for handling or preparing the treatment fluid 1316. The surface equipment 1318 may include equipment to support other operations at the well site 1300.

In embodiments, reducing or stopping loss circulation is an application for the polymer-nanofiller hydrogel. In implementations, the zone 1312 may be a loss circulation zone caused by features 1314 that are lost-circulation features of the subterranean formation 1306 at that portion of the wellbore 1302. In these implementations, the features 1314 along the wellbore 1302 at the zone 1312 cause or contribute to the loss circulation. The features 1314 if loss-circulation features may be structural features or characteristics of the subterranean formation 1306 at or near the wellbore 1302. The features 314 may be fractures, voids, vugulars (vugs), gaps, permeable channels, cavities, cavernous openings, etc. A vugular may be a cavity in subterranean rock and can be lined with mineral precipitates. The features 1314 or feature 1314 generally may be a permeable zone or unconsolidated portion of the subterranean formation 1306.

In a drilling operation, drilling fluid (mud) introduced from the surface 1304 flowing downward through the casing 1310 (and drill string) discharges from the drill bit (not shown) at the bottom of the wellbore 1302, and flows upward through the annulus between the subterranean formation 1306 and the casing 1310 toward the surface 1304 as return drilling fluid. Some or all of the drilling fluid flowing upward through the annulus may be lost through the features 1314 if loss circulation features (e.g., permeable zone or fractures) into the subterranean formation 1306 at the loss circulation zone 1312 in the wellbore 1302.

For a cementing operation (e.g., primary cementing), the cement slurry may be introduced from the surface 1304 into the casing 1310 in the wellbore 1302 and discharges from the bottom of the casing 1310. The cement slurry then flows up through the annulus between the formation 1306 and the casing 1310 toward the surface 1304. The cement slurry flowing upward in the annulus may be lost through the features 1314 (if the features 1314 are loss circulation features) into the subterranean formation 1314 at the zone 1312 if a loss circulation zone.

The present polymer-nanofiller hydrogels discussed above may be utilized to treat the zone 1312 as a loss circulation zone to cure the loss circulation. In implementations, the polymer-nanofiller hydrogels may be characterized as a loss circulation material (LCM). A treatment fluid 1316 as or having the polymer-nanofiller hydrogel (e.g., polymer-nanosand hydrogel) may be introduced (e.g., pumped) into the wellbore 1302. The treatment fluid 1316 may flow through the casing 1310, discharge from the bottom of the casing 1310, and flow upward through the annulus between the casing 1310 and the formation surface 1308 toward the surface 1304. The treatment fluid 1316 may invade the features 1314 to plug or seal the features 1314 to stop or reduce loss circulation (e.g., of fluid) from the wellbore 1302 through the features 1314 into the subterranean formation 1306. The treatment fluid 1316 may be pumped into the wellbore 1302 by a surface pump (e.g., mud pump, centrifugal pump, PD pump, etc.) of the surface equipment 1318 at the surface 1304.

Figure 14:
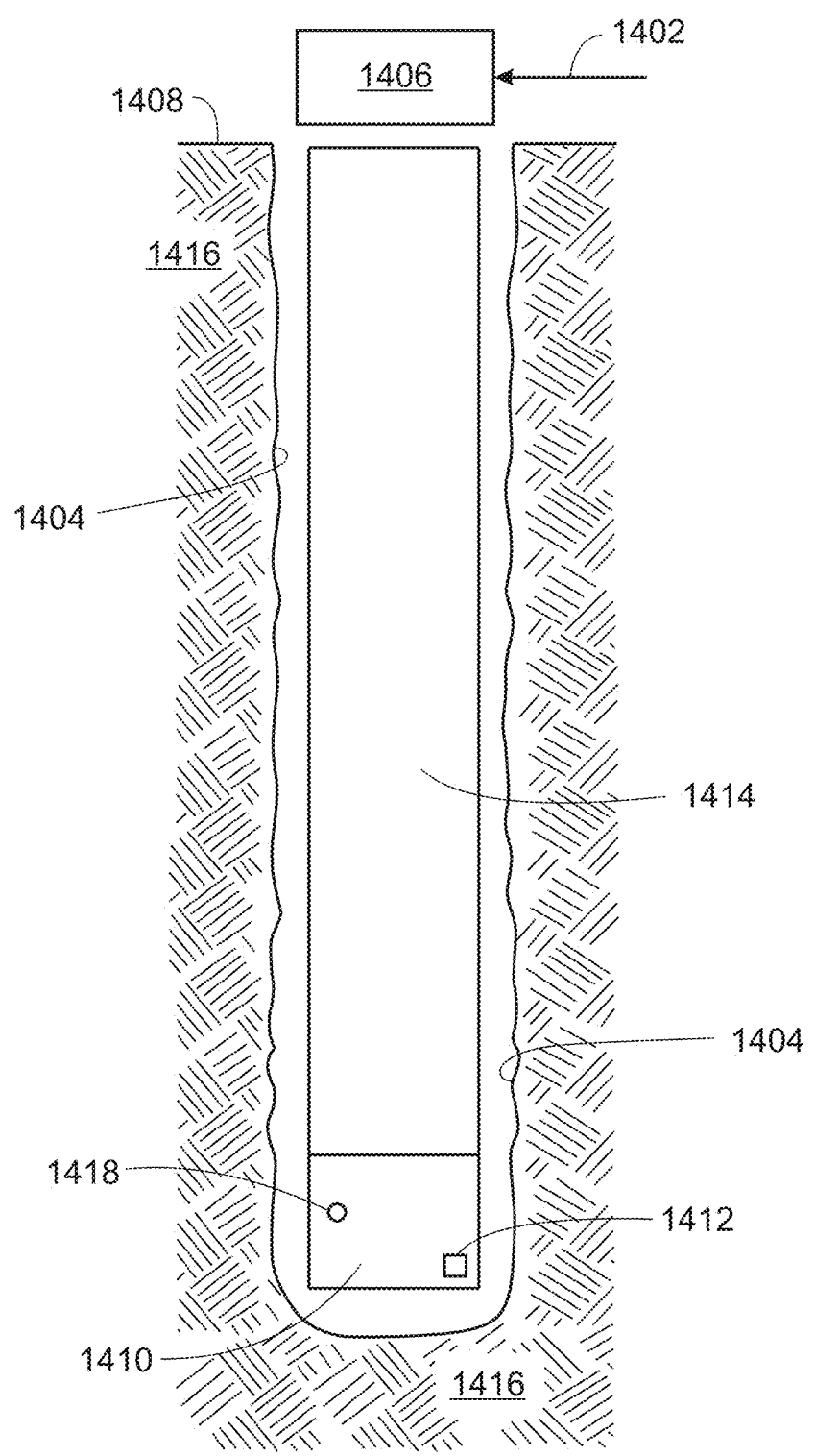
FIG. 14 is a well site that is a drill site.

FIG. 14 is a well site 1400 that is a drill site. In operation, the well site 1400 may prepare or receive drilling fluid 1402 having the present polymer-nanofiller hydrogel (e.g., polymer-nanosand hydrogel). The polymer-nanofiller hydrogel may improve or beneficial for the drilling fluid or drilling operation. In implementations, polymer-nanofiller (polymer-nanosand) hydrogel added to the drilling fluid can improve the mobility ratio by increasing the injected fluid (drilling fluid) viscosity, and reducing the permeability of water in the formation. Also, the polymer-nanofiller (polymer-nanosand) hydrogel may alter the wettability of the medium. Moreover, the nanosand particles could inhibit the thermal degradation of the polymer and safeguard the polymer backbone from rupturing under high temperature downhole conditions. The polymer-nanosand hydrogel may generally possess beneficial temperature tolerance under harsh downhole conditions.

Well drilling or borehole drilling may form a hole in the ground for the extraction or exploration of a natural resource, such as ground water, brine, natural gas, petroleum, metallic ore, and so on. The hole may be wellbore 1404 (borehole).

The well site 1400 includes surface equipment 1406, such as a mounted drilling rig, piping, storage tanks, and so on, at the Earth surface 1408. To form a hole in the ground, a drill bit 1410 having multiple cutters 1412 may be lowered into the hole and rotated to break the rock formations. In the rotation, the cutters 1412 may interface with the ground or formation to grind, cut, scrape, shear, crush, or fracture rock to drill the hole. The drill bit 1410 may be a component of a drill string 1414 or coupled to the drill string 1414. The drill bit 1410 may be lowered via the drill string 1414 into the wellbore 1404 (borehole) to drill the wellbore 1404 into a subterranean formation 1416 in the Earth crust. In operation, the drilling fluid 1402 (also known as drilling mud) having the polymer-nanofiller hydrogel is circulated down the drill string 1414 and through multiple nozzles 1418 in the drill bit 1410 to the bottom of the wellbore 1404. The drilling fluid 1404 may then flow upward towards the surface 1408 through an annulus between the drill string 1414 and the wall 1420 of the wellbore 1404. The drilling fluid 1402 may cool the drill bit 1410, apply hydrostatic pressure upon the formation 1416 penetrated by the wellbore 1404 to prevent or reduce fluids from flowing into the wellbore 1404, reduce the torque and the drag force induced by the friction between the drill string 1414 and the wellbore 1404, carry the formation cuttings up to the surface 1408, and so forth. The wellbore 1404 diameter may be, for example, in a range from about 3.5 inches (8.9 centimeters) to 30 inches (76 centimeters), or outside of this range. The depth of the wellbore 1404 can range from 300 feet (100 meters) to more than 30,000 feet (9,100 meters). Once the wellbore 1404 is drilled, the wellbore 1404 may be completed. Certain implementations of the drilling fluid 1402 having the polymer-nanosand hydrogel may be utilized as a completion fluid or workover fluid.

The polymer-nanofiller hydrogel (e.g., polymer-nanosand hydrogel) may also be incorporated in fracturing fluid in the hydraulic fracturing of a subterranean formation. Addition of the polymer-nanofiller (nanosand) hydrogel to hydraulic fracturing fluid may improve one or more properties of the fracturing fluid and one or more aspects of the hydraulic fracturing operation improved. The polymer-nanosand hydrogel may exhibit higher thermal stability, salinity tolerance and enhanced rheological properties in comparison to the neat-polymer counterparts. Incorporation of polymer-nanofiller (polymer-nanosand) hydrogel in injected fluid may also enhance oil recovery efficiency (EOR) by increasing the viscosity of the fluid. As mentioned, the polymer nanofiller (polymer-nanosand) hydrogel can also be applied for loss circulation applications.

Hydraulic fracturing employs fracturing fluid to generate fractures in a geological formation to stimulate production from the subterranean formation. Hydraulic fracturing is a well-stimulation technique in which rock is fractured by a pressurized fluid that may be a fracturing fluid. The fracturing typically generates conductive paths that increase the rate at which production fluids, such as crude oil or natural gas, can be produced from the reservoir formations. The amount of increased production may be related to the stimulated reservoir volume. Hydraulic fracturing may allow for the recovery of crude oil and natural gas from unconventional formations that geologists once believed were impossible to produce.

Figure 15:
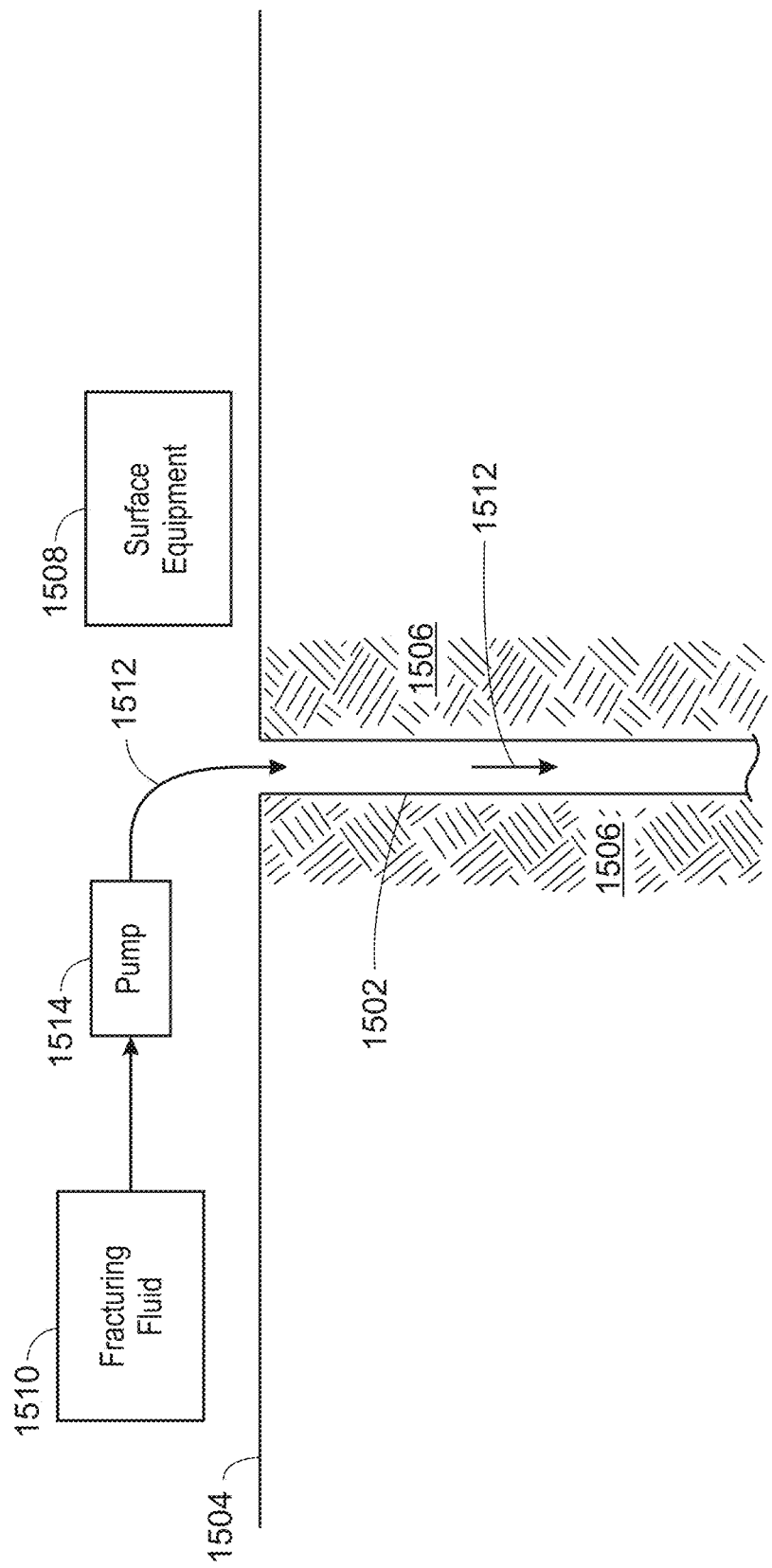
FIG. 15 is a well site having a wellbore through the Earth surface into a subterranean formation in the Earth crust.

FIG. 15 is a well site 1500 having a wellbore 1502 formed through the Earth surface 1504 into a subterranean formation 1506 in the Earth crust. The subterranean formation 1506 may be labeled as a geological formation, a reservoir formation, a reservoir, a rock formation, or a hydrocarbon formation, and the like. The subterranean formation 1506 may be a conventional or unconventional formation being subjected to hydraulic fracturing. The wellbore 1502 can be vertical, horizontal, or deviated. The wellbore 1502 can be openhole but is generally a cased wellbore. The annulus between the casing and the formation 1506 may be cemented. Perforations may be formed through the casing and cement into the formation 1506. The perforations may allow both for flow of fracturing fluid and proppant into the subterranean formation 1506 and for flow of produced hydrocarbon from the subterranean formation 1506 into the wellbore 1502. The surface equipment 1508 may also include equipment to support the hydraulic fracturing. The well site 1500 may have a hydraulic fracturing system including a source 1510 of fracturing fluid 1512 at the Earth surface 1504 near or adjacent the wellbore 1502. The source 1510 may include one or more vessels holding the fracturing fluid 1512. The fracturing fluid 1512 may be held in vessels or containers on ground, on a vehicle (for example, truck or trailer), or skid-mounted. The fracturing fluid 1510 may be, for example, water-based or oil-based.

The hydraulic fracturing system at the well site 100 may include motive devices such as one or more pumps 1514 to pump (inject) the fracturing fluid 1512 (with or without proppant) through the wellbore 1502 into the subterranean formation 1506. The pumps 1514 may be, for example, positive displacement pumps and arranged in series or parallel. Again, the wellbore 1502 may be a cemented cased wellbore and have perforations for the fracturing fluid 1512 to flow (injected) into the formation 1506. In some implementations, the speed of the pumps 1514 may be controlled to give desired flow rate of the fracturing fluid 1512. The system may include a control device to modulate or maintain the flow of fracturing fluid 1512 into the wellbore 1502 for the hydraulic fracturing. The control device may be, for example, a control valve(s). In certain implementations, as indicated, the control device may be the pump(s) 1514 as a metering pump in which speed of the pump 1514 is controlled to give the desired or specified flow rate of the fracturing fluid 1512. The set point of the control device may be manually set or driven by a control system.

The pump 1514 may be operationally coupled to the source 1510 to provide the fracturing fluid 1512 through the wellbore 1502 into the subterranean formation 1506 to hydraulically fracture the subterranean formation 1506 to generate fractures in the subterranean formation 1506. The pump 1514 may pump the fracturing fluid 1512 conveying proppant into the generated fractures. In some examples, the fracturing fluid 1512 may be initially pumped without proppant (a clean rate) during a beginning portion of the hydraulic fracturing, and subsequently pumped with proppant (a slurry rate) in a subsequent portion of the hydraulic fracturing. The fracturing fluid 1512 without proppant may hydraulically fracture the subterranean formation 1506. The fracture fluid 1512 with the proppant may hydraulically fracture the formation 1506 and increase width of hydraulic fractures generated by the fracturing fluid 1512 without proppant.

The fracturing fluid 1512 may be prepared (formulated and mixed) offsite prior to disposition of the fracturing fluid 1512 into the source 1510 vessel at the well site 1500. A portion (some components) of the fracturing fluid 1512 may be mixed offsite and disposed into the source 1510 vessel and the remaining portion (remaining components) of the fracturing fluid 1512 added to the source 1510 vessel or to a conduit conveying the fracturing fluid 1512. The fracturing fluid 1512 may be prepared onsite with components added to (and batch mixed in) the source 1500 vessel. Components may be added online to the source 1510 vessel or to a conduit conveying the fracturing fluid 1512 during the hydraulic fracturing and conveying of proppant.

Proppant is an example of a component that may typically be added to the suction conduit of the pump 1514. The hydraulic fracturing system at the well site 1500 may have a source of proppant, which can include railcars, hoppers, containers, or bins having the proppant. Proppant may be segregated by type or mesh size (particle size). The proppant can be, for example, sand or ceramic proppants. The proppant may have advanced coatings. The source of proppant may be at the Earth surface 1504 near or adjacent to the source of fracturing fluid 1510. The proppant may be added to the fracturing fluid 1512 such that the fracturing fluid 1512 includes the proppant. In some implementations, the proppant may be added (for example, via gravity) to a conduit conveying the fracturing fluid 1512, such as at a suction of a fracturing fluid pump 1514. The proppant may be added (e.g., via gravity) to the suction conduit of the pump 1514 via the control device. The control device may include a feeder or blender that receives proppant from the proppant source and discharges the proppant into pump 1514 suction conduit conveying the fracturing fluid 1512. Different proppant sizes may be utilized during the job. The fracturing fluid 1512 may be a slurry having the solid proppant. The pump 1514 discharge flow rates (frac rates) may include a slurry rate which may be a flow rate of the fracturing fluid 1512 as slurry having proppant. The pump 1514 discharge flow rates (frac rates) may include a clean rate which is a flow rate of fracturing fluid 1512 without proppant. In particular implementations, the fracturing system parameters adjusted may include at least pump(s) 1514 rate, proppant concentration in the fracturing fluid 1512, any on-line component addition rates (if implemented) to the fracturing fluid 1512, and component concentrations in the fracturing fluid 1512. Fracturing operations can be manual or guided with controllers. The well site 1500 may include a control system that supports or is a part of the hydraulic fracturing system.

An embodiment is a method of treating a wellbore in a subterranean formation, including applying a polymer-nanofiller hydrogel to the wellbore. In some implementations, applying the polymer-nanofiller hydrogel reduces water production from the subterranean formation into the wellbore. The polymer-nanofiller hydrogel includes polymer hydrogel and nanofiller. The polymer hydrogel includes crosslinked polymer in water. The crosslinked polymer may include crosslinked PAM, wherein the polymer hydrogel includes PAM hydrogel including the crosslinked PAM in the water. The crosslinked polymer may include crosslinked PS-PMMA copolymer, wherein the polymer hydrogel includes PS-PMMA hydrogel including the crosslinked PS-PMMA copolymer in the water. The nanofiller is nanosand or includes nanosand. The nanofiller may include hexagonal boron nitride in addition to the nanosand. In implementations, the crosslinked polymer and the nanofiller in combination are a polymer-nanofiller composite. The crosslinked polymer may be reinforced with the nanofiller. The polymer-nanofiller hydrogel may be a core-shell structure with the nanofiller as core and the polymer hydrogel as shell. The crosslinked polymer and the nanofiller may provide a core-shell structure with the nanofiller as core and the crosslinked polymer as shell.

Another embodiment is a method of forming a polymer-nanofiller hydrogel. The method includes dispersing nanofiller in water and adding polymer and crosslinker (e.g., HQ or HMT, or both) to the water to give a mixture including the polymer, the crosslinker, the nanofiller, and the water. The nanofiller is nanosand or includes nanosand. In implementations, the nanofiller may include hBN in addition to the nanosand. The method includes heating the mixture to crosslink the polymer to give crosslinked polymer. The polymer-nanofiller hydrogel includes the nanofiller and polymer hydrogel. The polymer hydrogel includes the crosslinked polymer and the water. The crosslinked polymer may be reinforced with the nanofiller. The polymer may be PAM, wherein the crosslinked polymer is or includes crosslinked PAM, and wherein the polymer hydrogel is or includes PAM hydrogel. The polymer may be PS-PMMA or PS-PMMA/DVB, wherein the crosslinked polymer is or includes crosslinked PS-PMMA or crosslinked PS-PMMA/DVB, and wherein the polymer hydrogel is or includes PS-PMMA hydrogel or PS-PMMA/DVB hydrogel. The adding of the polymer to the water may involve mixing the polymer with the water. Adding the crosslinker to the water may involve mixing the crosslinker with the water. The method may include mixing the mixture during heating the mixture. In implementations, the polymer-nanofiller hydrogel may have a core-shell structure with the polymer hydrogel as shell and the nanofiller as core. The crosslinked polymer and the nanofiller may form a composite of the crosslinked polymer and the nanofiller. The composite may be the crosslinked polymer reinforced with the nanofiller. The composite may be a core-shell structure with a core and a shell, wherein the core includes the nanofiller and the shell includes the crosslinked polymer.

Yet another embodiment is a polymer-nanofiller hydrogel including polymer hydrogel and nanofiller. The polymer hydrogel includes crosslinked polymer in water. The nanofiller is or includes nanosand. In implementations, the nanofiller may include hBN in addition to the nanosand. In implementations, at least 90 wt % of the polymer-nanofiller hydrogel is the water. The nanosand may have a particle size less than 100 nm. Concentration of the crosslinked polymer in the polymer-nanofiller hydrogel may be, for example, in a range of 1 wt % to 9 wt %. The polymer may be PAM, wherein the crosslinked polymer is or includes crosslinked PAM, and wherein the polymer hydrogel is or includes PAM hydrogel. Concentration of the crosslinked PAM in the polymer-nanofiller hydrogel may be, for example, in a range of 1 wt % to 9 wt %. The polymer may be PS-PMMA or PS-PMMA/DVB, wherein the crosslinked polymer is or includes crosslinked PS-PMMA or crosslinked PS-PMMA/DVB, and wherein the polymer hydrogel is or includes PS-PMMA hydrogel or PS-PMMA/DVB hydrogel. In implementations, the crosslinked polymer is reinforced with the nanofiller, wherein a weight ratio of the nanofiller to the crosslinked polymer is less than 0.05. In some implementations, the polymer-nanofiller hydrogel is or includes a core-shell structure having the nanofiller as core and the polymer hydrogel as shell. In certain implementations, the polymer-nanofiller hydrogel is or includes a core-shell structure having the nanofiller as core and the crosslinked polymer hydrogel as shell, wherein a weight ratio of the nanofiller to the crosslinked polymer is at least 0.2.

A number of implementations have been described. Nevertheless, it will be understood that various modifications may be made without departing from the spirit and scope of the disclosure.

What is claimed is:

1. A method of treating a wellbore in a subterranean formation, comprising:
   grinding sand to give nanosand comprising a particle size less than 100 nanometers (nm);
   sonicating water and nanofiller comprising the nanosand in a vessel to disperse the nanofiller in the water;
   adding polymer and crosslinker to the vessel to give a mixture comprising the polymer, the crosslinker, the nanofiller, and the water wherein the crosslinker comprises hydroquinone (HQ) and hexamethylenetramine (HMT);
   heating the mixture at a temperature of at least 160° C. to crosslink the polymer to give the polymer as crosslinked polymer, thereby forming in the vessel a polymer-nanofiller hydrogel comprising a composite of the nanofiller and a polymer hydrogel, the polymer hydrogel having the crosslinked polymer and the water, wherein the crosslinked polymer is reinforced by the nanofiller, wherein a weight ratio of the nanofiller to the crosslinked polymer is less than 0.05, wherein the polymer-nanofiller hydrogel comprises the crosslinked polymer in a range of 2 wt % to 6 wt %, and wherein at least 90 weight percent (wt %) of the polymer-nanofiller hydrogel is the water; and incorporating the polymer-nanofiller hydrogel from the vessel in a fracturing fluid in hydraulic fracturing of the subterranean formation.

2. The method of claim 1, wherein the crosslinked polymer and the nanofiller in combination are the composite as a polymer-nanofiller composite, and wherein the nanofiller comprises hexagonal boron nitride in addition to the nanosand.

3. The method of claim 1, wherein grinding the sand comprises ball milling natural desert sand, wherein the polymer added to the vessel comprises polyacrylamide (PAM) having a molecular weight less than 1,600,000 Daltons, wherein the crosslinked polymer comprises crosslinked PAM and is reinforced with the nanofiller, wherein the polymer hydrogel is PAM hydrogel.

4. The method of claim 1, wherein the polymer-nanofiller hydrogel comprises a core-shell structure with the nanofiller as core and the polymer hydrogel as shell.

5. The method of claim 1, wherein the crosslinked polymer and the nanofiller comprise a core-shell structure with the nanofiller as core and the crosslinked polymer as shell.

6. The method of claim 1, wherein grinding the sand comprises milling natural desert sand to give the nanosand, wherein the crosslinked polymer comprises crosslinked polyacrylamide (PAM), and wherein the polymer hydrogel comprises PAM hydrogel comprising the crosslinked PAM in the water.

7. The method of claim 1, wherein the crosslinked polymer comprises crosslinked polystyrene-polymethylmethacrylate (PS-PMMA) copolymer, and wherein the polymer hydrogel comprises PS-PMMA hydrogel comprising the crosslinked PS-PMMA copolymer in the water.

8. The method of claim 1, wherein the mixture in the vessel is an in-situ synthesis solution, wherein forming the polymer-nanofiller hydrogel comprises in-situ synthesis, wherein the crosslinked polymer and the nanofiller in combination are the composite as a polymer-nanofiller composite, and wherein applying the polymer-nanofiller hydrogel reduces water production from the subterranean formation into the wellbore.

9. The method of claim 1, wherein grinding the sand comprises milling the sand to give the nanosand, wherein the polymer comprises polyacrylamide (PAM), wherein the crosslinked polymer comprises crosslinked PAM, and wherein the polymer hydrogel comprises PAM hydrogel.

10. The method of claim 9, wherein milling the sand comprises ball milling the sand, wherein the sand comprises natural desert sand, and wherein heating the mixture comprises heating the mixture for a time in a range of 12 hours to 60 hours at the temperature of at least 160° C.

11. The method of claim 10, comprising mixing the mixture while heating the mixture, wherein heating the mixture comprises at least one of heating the mixture via an external electrical heater on the vessel or via a heating jacket on the vessel that receives a heating fluid.

12. The method of claim 10, wherein heating the mixture in the vessel comprises heating the mixture via pumped recirculation heating of the mixture from the vessel through a conduit and a heat exchanger to the vessel, and wherein the heat exchanger comprises a shell-and-tube heat exchanger.

13. The method of claim 1, comprising adding salt to the vessel, wherein the mixture comprises the salt, wherein the salt comprises potassium chloride (KCl), sodium chloride (NaCl), or calcium chloride ($CaCl_2$)), or any combinations thereof, and wherein crosslinker comprises an organic crosslinker.

14. The method of claim 13, wherein concentration of the salt in the mixture is in the range of 0.05 wt % to 0.5 wt %, and wherein the salt comprises KCl.

15. The method of claim 1, comprising purging the mixture with an inert gas.

16. The method of claim 15, wherein purging the mixture with the inert gas removes dissolved oxygen in the water, and wherein the inert gas comprises nitrogen gas.

* * * * *